US012049035B2

(12) United States Patent
Park et al.

(10) Patent No.: US 12,049,035 B2
(45) Date of Patent: Jul. 30, 2024

(54) MOLD APPARATUS

(71) Applicant: LG Electronics Inc., Seoul (KR)

(72) Inventors: Jaesin Park, Seoul (KR); Insoo Gwag, Seoul (KR); Wonseok Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 261 days.

(21) Appl. No.: 17/402,088

(22) Filed: Aug. 13, 2021

(65) Prior Publication Data

US 2022/0048228 A1  Feb. 17, 2022

(30) Foreign Application Priority Data

Aug. 14, 2020  (KR) .................. 10-2020-0102605

(51) Int. Cl.
  *B29C 45/44*  (2006.01)
  *B29C 45/26*  (2006.01)
  *B29C 45/17*  (2006.01)

(52) U.S. Cl.
  CPC .......... *B29C 45/44* (2013.01); *B29C 45/2602* (2013.01); *B29C 45/2612* (2013.01); *B29C 2045/1797* (2013.01); *B29C 2045/4485* (2013.01)

(58) Field of Classification Search
  None
  See application file for complete search history.

(56) References Cited

FOREIGN PATENT DOCUMENTS

| CN | 101444949 | 12/2010 | |
|---|---|---|---|
| CN | 107379414 A | * 11/2017 | ............. B29C 45/26 |
| JP | H06170865 | 6/1994 | |
| JP | H0825521 | 1/1996 | |
| JP | 2000246771 | 9/2000 | |
| KR | 100982626 | 9/2010 | |

OTHER PUBLICATIONS

Urumchi CN107379414A 2017 English Translation (Year: 2017).*
International Search Report and Written Opinion in International Appln. No. PCT/KR2021/010753, dated Nov. 29, 2021, 10 pages.

* cited by examiner

*Primary Examiner* — Jacob T Minskey
*Assistant Examiner* — Adrien J Bernard
(74) *Attorney, Agent, or Firm* — Fish & Richardson P.C.

(57) ABSTRACT

A mold apparatus for molding a rotating member includes: a column mold portion including a first column molding hole extending in a first direction and configured to mold a column portion therein and a first blade molding groove formed as an intaglio on an inner circumferential surface of the first column molding hole to have a shape corresponding to a blade and configured to mold the blade therein, and an extraction guide configured to push a first end of the column portion in the first direction to thereby extract the column portion from the first column molding hole, at least a portion of the extraction guide being positioned inside the first column molding hole. The extraction guide is configured to press the column portion to thereby extract the column portion from the first column molding hole while the column portion rotates in an inclined direction of the blade.

19 Claims, 15 Drawing Sheets

MOLD APPARATUS

CROSS-REFERENCE TO RELATED APPLICATIONS

This application claims the benefit of Korean Patent Application No. 10-2020-0102605, filed on Aug. 14, 2020, which is hereby incorporated by reference as if fully set forth herein.

TECHNICAL FIELD

The present disclosure relates to a mold apparatus and, more particularly, to a mold apparatus for rotatively extracting a rotating member from a column mold portion.

BACKGROUND

Injection molding is a manufacturing process of making various products by injecting a molten material (hereinafter, injection liquid) into a mold. Specifically, injection molding refers to a molding method of processing molded products by injecting injection liquid molten by heating into a mold and then solidifying or hardening the injection liquid.

An injection molding process is performed roughly in five steps.

Specifically, the injection molding process includes a first step of providing a space for solidifying or hardening injection liquid inside a mold by combining a fixed mold and a movable mold, a second step of introducing the injection liquid into the space, a third step of continuously introducing the injection liquid while causing a nozzle to maintain pressure in order to compensate for a space in which volume is contracted while the injection liquid inside the mold cools, a fourth step of solidifying or hardening the injection liquid in the mold, and a fifth step of opening the movable mold to eject a solidified or hardened molded product from the mold.

In the fifth step, in order to eject the molded product from the mold, an extraction pin is installed inside the fixed mold so that the extraction pin pushes the molded product and demolds the molded product when opening the mold.

On the other hand, when the surface of the molded product has an undercut shape, an additional rotating shaft may be provided to push and rotatively extract the molded product while the rotating shaft rotates. Korean Patent Registration No. 10-0800257 discloses an injection mold including a screw molding rotation means for rotating a screw molding shaft. The injection mold is provided with the screw molding rotation means, which is a separate power device, to rotatively eject the molded product by transmitting rotational power to the screw molding shaft.

However, Korean Patent Registration No. 10-0800257 inevitably includes a separate rotational power generating device, that is, a motor etc., in a mold apparatus. As a result, the mold apparatus becomes too complicated, so that it is difficult to design and manufacture the mold apparatus, and vibration and noise may excessively occur.

In contrast, when the surface of the molded product has the undercut shape, a mold in which a plurality of divided movable molds is combined during injection molding is provided, and the molded product may be extracted from the mold without rotating by separating the plural movable molds.

However, when extracting the molded product having the undercut shape by separating the plural movable molds, more parting lines than the number of the movable molds may be inevitably generated on the surface of the molded product. Then, a user using the molded product may suffer from inconvenience due to sharp parting lines.

In addition, flashes formed when injection liquid flows into a gap generated by the plural movable molds being separated by processing tolerance or molding pressure may be formed on the surface of the molded product. Moreover, when the plural movable molds are not smoothly connected to each other, a stepped shape may be formed on the surface of the molded product.

Therefore, when the surface of the molded product has the undercut shape, a mold apparatus capable of minimizing generation of parting lines, flashes, and steps in the molded product needs to be designed. Furthermore, designing a mold apparatus from which a separate rotational power device is omitted in order to rotatively extract the molded product is an important task in this technical field.

SUMMARY

Accordingly, the present disclosure is directed to a mold apparatus that substantially obviates one or more problems due to limitations and disadvantages of the related art.

Embodiments of the present disclosure provide a mold apparatus including a guide moving portion that rotatively extracts a rotating member molded by injection molding.

Embodiments of the present disclosure provide a mold apparatus that minimizes generation of parting lines on the surface of a rotating member during injection molding.

Embodiments of the present disclosure provide a mold apparatus that minimizes defects such as flashes or surface steps formed on the exterior of a rotating member.

Embodiments of the present disclosure provide a mold apparatus having a simple design structure by omitting a separate rotational power device for rotation during rotative extraction.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, provided herein is a mold apparatus for molding a rotating member including a column portion and a blade.

The column portion extends in one direction, and the blade is provided on an outer circumferential surface of the column portion and extends from one end to the other end of the column portion.

Specifically, a mold apparatus according to an embodiment of the present disclosure includes a column mold portion and an extraction guide. The column mold portion includes a first column molding hole in which the column portion is molded and a first blade molding groove formed as an intaglio on an inner circumferential surface of the first column molding hole to have a shape corresponding to the blade. The first column molding hole extends in the one direction.

The extraction guide is provided to push the one end of the column portion in the one direction so that the column portion is extracted from the first column molding hole, wherein at least a part of the extraction guide is positioned inside the first column molding hole. The column portion is pressed by the extraction guide and is extracted from the first column molding hole while rotating in an inclined direction of the blade.

The extraction guide may be moved in the one direction to push the column portion while rotating in the inclined direction of the blade.

The extraction guide may have one end positioned outside the column mold portion and the other end positioned inside the first column molding hole.

The mold apparatus may further include a guide moving portion connected to the one end of the extraction guide to move the extraction guide in the one direction.

The extraction guide may include a rotation guide groove provided on an outer circumferential surface of the extraction guide and extending to be inclined to correspond to the inclined direction of the blade.

The column mold portion may include a rotation guide portion protruding toward the rotation guide groove and inserted into the rotation guide groove, and the extraction guide may rotate in an inclined direction of the rotation guide groove by the rotation guide portion while moving in the one direction.

The extraction guide may have one end positioned outside the column mold portion and the other end positioned inside the first column molding hole and inserted into the column portion so that the column portion is formed in a cavity shape.

The extraction guide may include a secondary extractor provided to be movable in the one direction from the other end of the extraction guide, wherein at least a part of the secondary extractor is provided at the other end of the extraction guide.

At least the part of the secondary extractor may be moved in the one direction from the other end of the extraction guide in a state in which the column portion is extracted from the first column molding hole.

The mold apparatus may further include a guide moving portion connected to the one end of the extraction guide to move the extraction guide in the one direction.

The secondary extractor may include a pressure moving portion positioned at the other end of the extraction guide and an extension portion provided inside the extraction guide and extending toward the guide moving portion from the pressure moving portion.

The guide moving portion may be connected to the extension portion and may be provided to move the extension portion in the one direction with respect to the extraction guide, and the secondary extractor may be provided to cause the extension portion to be moved in the one direction to move the pressure moving portion in the one direction.

The guide moving portion may include a first moving portion connected to the one end of the extraction guide to move the extraction guide in the one direction and a second moving portion connected to the extension portion to move the extension portion in the one direction with respect to the extraction guide.

The guide moving portion may include a driving portion connected to the second moving portion to move the second moving portion in the one direction and a coupling portion provided at the first moving portion and selectively coupled to the second moving portion.

The first moving portion may be moved in the one direction by the second moving portion as the coupling portion is coupled to the second moving portion.

The column mold portion may include a fixing portion provided to face the coupling portion and coupled to the coupling portion when the coupling portion contacts the fixing portion as the first moving portion is moved in the one direction.

The coupling portion may be decoupled from the second moving portion and may be coupled to the fixing portion when the coupling portion contacts the fixing portion, and a position of the first moving portion may be fixed.

The secondary extractor may include a connector extending from the extension portion to penetrate an outer circumferential surface of the extraction guide and connected to the second moving portion, wherein the connector is exposed to an exterior of the secondary extractor.

The extraction guide may include a sliding hole penetrated by the connector and extending in the one direction. The extraction guide may be provided to be moved in the one direction while rotating in the inclined direction of the blade, and the second moving portion may include an accommodator extending in an outer circumferential direction of the extraction guide to accommodate the connector to be rotatable.

The rotating member may further include a bottom portion connected to the other end of the column portion and having a wider diameter than a diameter of the column portion. The mold apparatus may include a bottom mold portion positioned in the one direction of the column mold portion and including a bottom molding space which communicates with the first column molding hole and is provided to mold the bottom portion.

The bottom mold portion may be formed of a plurality of split bodies divided in an outer circumferential direction of the bottom portion, and the split bodies may be provided to be movable in a radial direction of the bottom portion.

The bottom molding space of the bottom mold portion may be open in the one direction, and the mold apparatus may include a shielding mold portion positioned in the one direction of the bottom mold portion and provided to shield the bottom molding space.

The shielding mold portion may include an injector provided to inject injection liquid into the bottom molding space. The rotating member may be provided with a shaft coupling member on the bottom portion, and the shielding mold portion may be provided to shield the bottom molding space after the shaft coupling member is inserted into the bottom molding space.

The bottom mold portion may include a second column molding hole positioned in the one direction of the first column molding hole to communicate the first column molding hole with the bottom molding space.

A second blade molding groove in which at least a part of the blade is molded may be provided on an inner circumferential surface of the second column molding hole, and the second blade molding groove may be connected to the first blade molding groove to correspond to a shape of the blade.

The first blade molding groove may be provided in plural in number and the plural first blade molding grooves may be separately disposed in an inner circumferential direction of the first column molding hole. The second blade molding groove may be provided in plural in number and the plural second blade molding grooves may be separately disposed in an inner circumferential direction of the second column molding hole.

The rotating member may include a column coupling portion extending from the other end of the column portion in the other direction facing the one direction and having a smaller diameter than a diameter of the column portion.

The mold apparatus may include a column coupling mold portion positioned in the other direction of the column mold portion and having a column coupling molding space which communicates with the first column molding hole and is provided to mold the column coupling portion.

The column coupling mold portion may be formed of a plurality of split bodies divided in an outer circumferential direction of the column coupling portion, and the split bodies may be provided to be movable in a radial direction of the column coupling portion.

Respective features of the above-described embodiments may be implemented in combination with other embodiments unless they are contradictory or exclusive to other embodiments.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
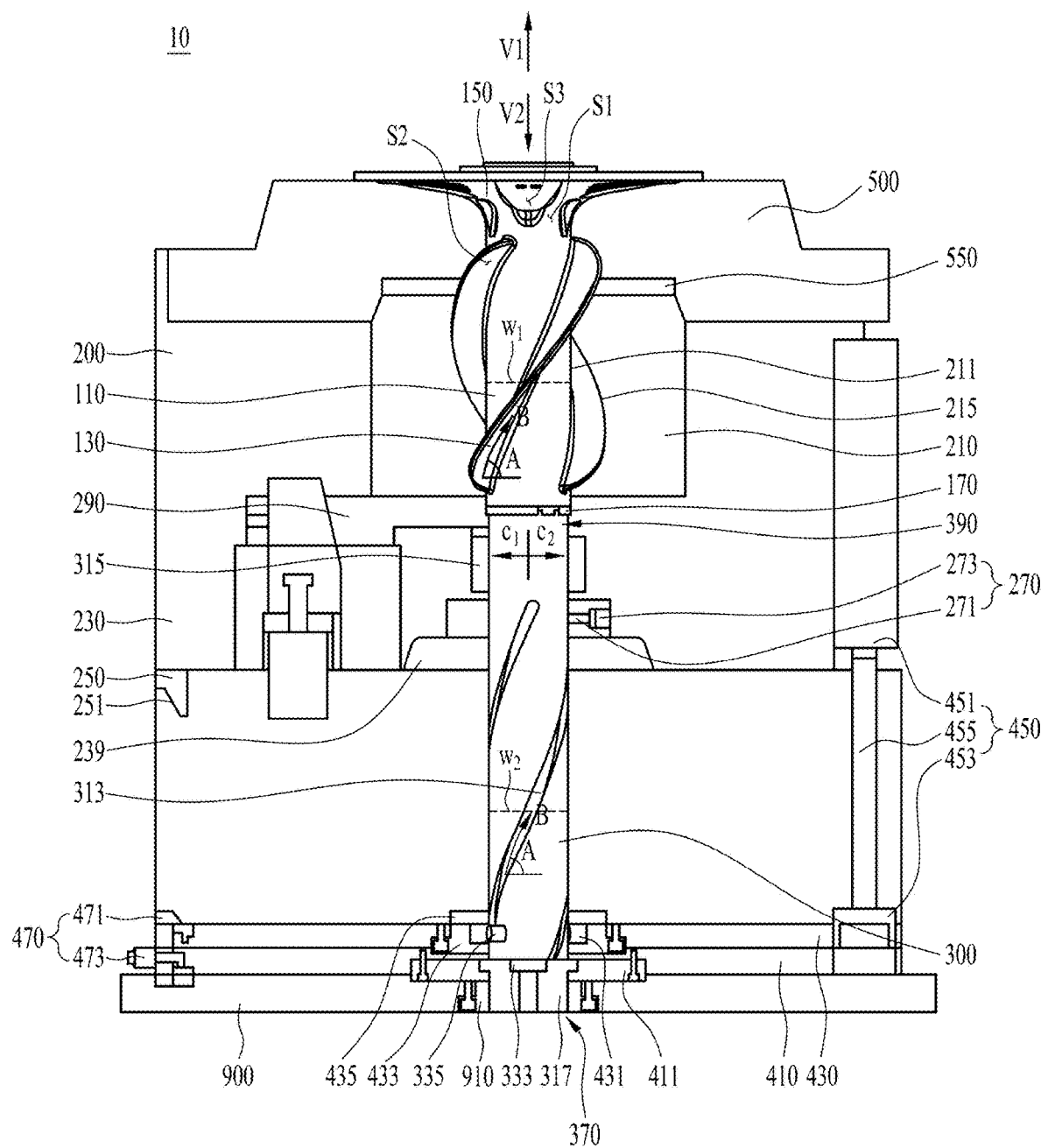
FIG. 1 is a view illustrating the inside of a mold apparatus according to an embodiment of the present disclosure.

Reference will now be made in detail to the embodiments of the present disclosure, examples of which are illustrated in the accompanying drawings. In the present disclosure, the same or similar elements are denoted by the same or similar reference numerals even in different embodiments, and a description thereof may be replaced with a description given first. A singular representation may include a plural representation unless it represents a definitely different meaning from the context. In describing embodiments of the present disclosure, a detailed description of known technology related to the present disclosure will be omitted when it may unnecessarily obscure the subject matter of the present disclosure. It should be noted that the attached drawings aim to facilitate understanding of the embodiments of the present disclosure and should not be construed as limiting the technical spirit and idea of the present disclosure.

In addition, the terms to be described later are terms defined taking into consideration functions obtained in accordance with the present disclosure. The definitions of these terms should be determined based on the whole content of this specification because they may be changed in accordance with the option of a user or an operator or a usual practice. The terms used in the detailed description are for the purpose of describing the embodiments only of the present disclosure and are not intended to be limiting of the embodiments of the disclosure. In the present disclosure, the terms "comprises", includes," etc. specify any features, numbers, steps, operations, elements, portions thereof, or combinations thereof and should not be interpreted as precluding the presence or possibility of one or more other features, numbers, steps, operations, elements, portions thereof, or combinations thereof.

Additionally, in describing components of the embodiments of the present disclosure, terms such as first, second, A, B, (a), and (b) may be used. These terms are used solely for the purpose of differentiating one component from another, and the substance, order, or sequence of the components are not limited by the terms.

Figure 2:
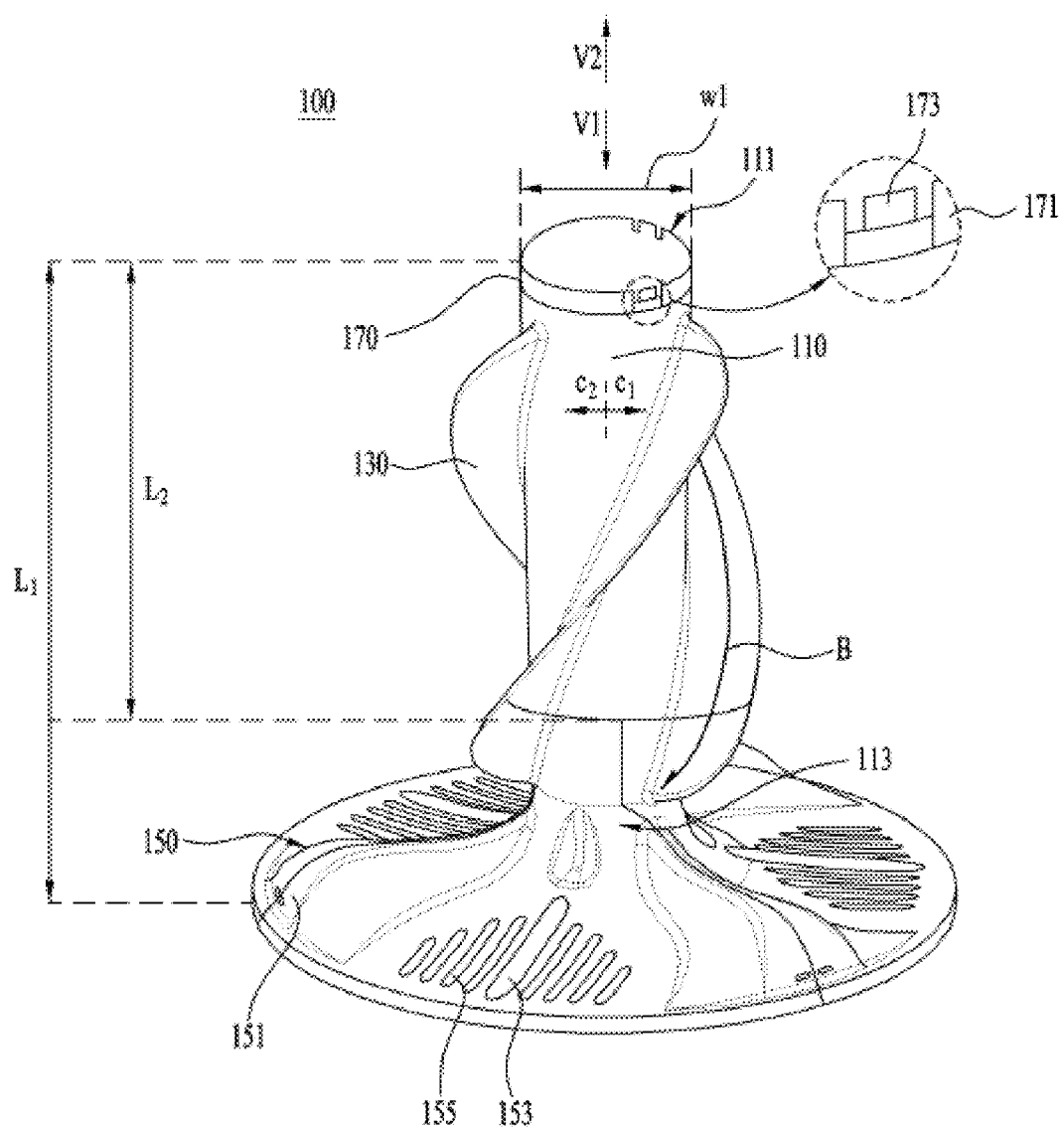
FIG. 2 is a perspective view illustrating a rotating member molded by the mold apparatus according to an embodiment of the present disclosure.

FIG. 1 is a view illustrating the inside of a mold apparatus according to an embodiment of the present disclosure and FIG. 2 is a perspective view illustrating a rotating member molded by the mold apparatus according to an embodiment of the present disclosure.

Referring to FIG. 1, a mold apparatus 10 may include a column mold portion 200 and a bottom mold portion 500. The mold apparatus 10 may injection-mold a rotating member 100 and rotatively extract the rotating member 100.

A cross-sectional view of the inside of the mold apparatus 10 before the rotating member 100 inside the column mold portion 200 and the bottom mold portion 500 is molded and extracted (hereinafter, a first process) is illustrated. The first process may mean a process in which injection liquid is introduced into the bottom mold portion 500 and the column mold portion 200 in a shielding mold portion 600 to be described later and the molding of the rotating member 100 is completed.

Referring to FIG. 2, the rotating member 100 may include a column portion 110, a blade 130, and a bottom portion 150.

Specifically, the column portion 110 may extend from one end 111 toward the other end 113. That is, the column portion 110 may extend in one direction V1 from the one end 111 toward the other end 113. The column portion 110 may be provided in a cavity shape.

In addition, the blade 130 may be provided to protrude from an outer circumferential surface of the column portion 110 in a radial direction of the column portion 110. The blade 130 may form an inclination with respect to the one direction V1 and may extend from the one end 111 of the column 110 toward the other end 113 of the column 110.

In other words, the blade 130 may be provided on the outer circumferential surface of the column portion 110 while forming an inclination with respect to circumferential directions C1 and C2 of the column portion 11. The inclination formed by the blade 130 is kept constant and the blade 130 may be provided on the column portion 110 in the form of a screw.

The blade 130 may be provided in plural in number. The plural blades 120 may be separately disposed along a circumferential direction C of the column portion 110 and may extend to be inclined with respect to the one direction V1.

Meanwhile, the bottom portion 150 may be connected to the other end 113 of the column portion 110 and provided to have a wider diameter than the column portion 110. The bottom portion 150 may have a circular cross-section. The center of the bottom portion 150 may coincide with the center of the column portion 110. The cross-section of the column portion 110 may also have a circular shape or a shape protruding from the bottom portion 150.

In addition, the bottom portion 150 may include a protrusion protruding from the bottom portion 150 toward the other direction V2 which is opposite to the one direction V1 and extending in a radial direction of the bottom portion 150. The protrusion may be provided in plural and the plural protrusions may be separately disposed in a circumferential direction of the bottom portion 150.

The protrusion may include main protrusions 151 connected to the column portion 110 and first sub-protrusions 153 provided between the main protrusions 151. A protrusion height of the first sub-protrusions 153 from the bottom portion 150 toward the other direction V2 is lower than a protrusion height of the main protrusions 151.

The protrusion may further include second sub-protrusions 155 provided between the main protrusions 151 and the first sub-protrusions 153. A protrusion height of the second sub-protrusions 155 from the bottom portion 150 is lower than the protrusion height of the first sub-protrusions 153.

The rotating member 100 may be used for various purposes. For example, the rotating member 100 may be provided inside a laundry treatment apparatus for washing clothes. The laundry treatment apparatus may include a tub for storing water and a drum provided inside the tub and configured to store clothes. The rotating member 100 is provided inside the drum and rotates to form a water flow.

Specifically, the rotating member 100 may be provided to be rotatable separately from the drum by allowing the bottom portion 150 to be disposed on the bottom of the drum. The column portion 110 may extend from the bottom portion 150 toward an open surface of the drum so as to rotate.

When the column portion 110 rotates, a water flow may be formed in water inside the drum by the blade 130. Then, a mixing ratio between clothes, i.e., laundry, and detergent, may be improved by the water flow, and frictional force acting on the laundry may be increased, so that washing efficiency may be effectively improved.

The blade 130 may extend to be inclined with respect to a longitudinal direction of the column portion 110, so that an ascending water flow in which water inside the drum flows from the bottom to the top or a descending water flow in which water inside the drum flows from the top to the bottom may be formed during rotation. The rotating member 100 molded by the mold apparatus 10 according to an embodiment of the present disclosure may form a stereoscopic fluid flow during rotation.

However, the rotating member 100 is not necessarily provided only in the laundry treatment apparatus and may be provided in any apparatus requiring the rotational member 100 including the inclined blade 130 on the column portion 110 extending from the one end 111 to the other end 113.

For example, the rotating member 100 may be a gear having a screw thread of a screw type, such as a worm gear. The rotating member 100 may be provided to flow gas through rotation and may be used for various other purposes.

The rotating member 100 may include a column coupling portion 170 extending from the other end 113 of the column portion 110 in the other direction V2 and having a smaller diameter than the diameter of the column portion 110. The column coupling portion 170 may extend with a stepped portion from the column portion 110.

The column coupling portion 170 may include column coupling bodies 171 separately disposed along the circumference of the other end 113 of the column portion 110 and a hook coupler 173 provided between a pair of the column coupling bodies 171.

Referring to FIG. 1, the column mold portion 200 includes a column molding central core 210 in which at least a part of the rotating member 100 is molded, a column coupling mold portion 290 in which the column coupling portion 170 included in the rotating member 100 is molded, and a column mold body 230 for accommodating the column molding central core 210 and the column coupling mold portion 290 and forming the exterior of the column mold portion 200.

The column molding central core 210 and the column coupling mold portion 290 form a space in which the rotating member 100 is molded, and the column mold body 230 is a space in which the rotating member 100 is molded may not contact the space in which the rotating member 100 is molded. Therefore, since the column molding central core 210 and the column coupling mold portion 290 are members that are in contact with injection liquid of high temperature, they may be made of a material with high heat durability, unlike the column mold body 230.

The column molding central core 210 may be formed of three divided bodies which are stacked in one direction V1 to form a first column molding hole 211. Therefore, the manufacturer of the mold apparatus 10 may more easily mold the shape of the first column molding hole 211.

The column molding central core 210 may be fixed without changing the position thereof during an injection molding process of the mold apparatus. That is, the column molding central core 210 may not be separated in a radial direction of the column portion 110. Accordingly, parting lines formed on an outer circumferential surface of the column portion 110 may be minimized, and formation of flashes or steps may also be minimized.

The column mold portion 200 may include the first column molding hole 211 extending in the one direction V1 and molding the column portion 110 therein. Specifically, the first column molding hole 211 may be formed by penetrating the column molding central core 210 in the one direction V1.

The height extending by the first column molding hole 211 and the column molding central core 210 based on the one direction V1 may be formed to be smaller than a height B of the column portion 110.

In the first column molding hole 211 may be formed by molding at least a part of the column portion 110 and an outer diameter W1 of the column portion 110 and the diameter of the first column molding hole 211 may correspond to each other.

The column mold portion 200 may include a first blade molding groove 215 provided as an intaglio on an inner circumferential surface of the first column molding hole 211 and having a shape corresponding to the blade 130. Specifically, the first blade molding groove 215 may be recessed on the inner circumferential surface of the first column molding hole 211 to correspond to the height of the blade 130 protruding from the column portion 110.

The mold apparatus 10 according to an embodiment of the present disclosure may include an extraction guide 300, at least a part of which is located inside the first column molding hole 211. The extraction guide 300 may be provided to extract the column portion 110 from the first column molding hole 211 by pushing an end 111 of the column portion 110 in the one direction V1.

The extraction guide 300 may press the column portion 110 to extract the column portion 110 from the first column molding hole 211 while rotating in an inclined direction B of the blade 130.

The blade 130 may form an inclination A with respect to the circumferential direction C of the column portion 110 and may be provided on the outer circumferential surface of the column portion 110 from the one end 111 toward the other end 113.

The extraction guide 300 may also rotate in the inclined direction B of the blade 130. That is, the extraction guide 300 may be rotatively moved in an inclined direction B of a rotation guide groove 313, to be described later, which is provided on the outer circumferential surface of the blade 130 and extends to be inclined in the one direction V1. An inclination angle A of the rotation guide groove 313 may correspond to an inclination angle A of the blade 130.

The rotation guide groove 313 may be provided on an outer surface of the extraction guide 300 so as to correspond to the inclined direction B of the blade 130 and may extend from an end 317 of the extraction guide 300 toward the other end 319 of the extraction guide 300.

The inclined direction B of the rotation guide groove 313 may correspond to the inclined direction B of the blade 130, and the blade 130 may be rotatively extracted from the first column molding hole 211 without damage.

The mold apparatus 10 according to an embodiment of the present disclosure may include the column coupling mold portion 290 which may be positioned in the other direction V2 of the column mold portion 200 and may include a column coupling molding space communicating with the first column molding hole 211 and provided to mold the column coupling portion 170.

Specifically, the column coupling mold portion 290 may be provided in the column mold body 230 and may be positioned in the other direction V2 of the column molding central core 210, so that the column coupling mold portion 290 may contact the column molding central core 210.

At least a part of the column coupling mold portion 290 may extend in a central direction of the extraction guide 300 from one surface toward the extraction guide 300 and may be provided in contact with an outer circumferential surface of the extraction guide 300. That is, at least a part of the column coupling mold portion 290 may be inserted into a separated space between the column coupling body 171 and the hook coupler 173 so as to contact the outer circumferential surface of the extraction guide 300.

The column coupling molding space may be provided to correspond to the shape of the column coupling portion 170, and a distance from the center of the extraction guide 300 to the column coupling mold portion 290 may be formed to be smaller than the diameter of the first column molding hole 211.

At least a part of the other end 319 of the extraction guide 300 may be inserted into the column coupling portion 170, and the diameter of an inner circumferential surface of the post coupling portion 170 may be provided to correspond to the diameter of the outer circumferential surface of the extraction guide 300.

The column coupling mold portion 290 is made of a plurality of split bodies divided along an outer circumferential direction of the column coupling portion 170, and the split bodies may be provided to be movable in a radial direction of the column coupling portion 170.

The column coupling mold portion 290 may move in the radial direction of the column coupling portion 170 and may be separated from the column coupling portion 170 and the extraction guide 300 when the extraction guide 300 extracts the column portion 110 while pushing the column portion 110 in the one direction V1.

The one end 317 of the extraction guide 300 may be located outside the column mold portion 200, and at least a part of the other end 319 of the extraction guide 300 may be located inside the first column molding hole 211. In this case, a diameter W1 of the inner circumferential surface of the column 110 may correspond to a diameter W2 of the outer circumferential surface of the extraction guide 300.

The other end 319 of the extraction guide 300 may be provided by being inserted into the column portion 110 so that the column portion 110 is molded in a cavity shape. In this case, the diameter W1 of the inner circumferential surface of the column portion 110 may be formed to be smaller than the diameter W2 of the outer circumferential surface of the extraction guide 300.

The mold apparatus 10 according to an embodiment of the present disclosure may include a guide moving portion 400 connected to the one end 317 of the extraction guide 300 to move the extraction guide 300 in the one direction V1. The guide moving portion 400 to be described later may be provided in the other direction V2 from the column mold portion 200 to move the extraction guide 300.

The mold apparatus 10 according to an embodiment of the present disclosure may include a fixing plate 900 positioned in the other direction V2 of the guide moving portion 400 to support the guide moving portion 400 and the one end 317 of the extraction guide 300.

The position of the fixing plate 900 may not move during a rotative extraction process. The fixing plate 900 supports the one end 317 of the extraction guide 300. In a first process system to be described later, the fixing plate 900 may be separated from the one end 317 of the extraction guide 300 and, when a second process is ended, the fixing plate 900 may support the one end 317 of the extraction guide 300 again.

The fixing plate 900 may include a fixing bush 910 which is in contact with one end 317 of the extraction guide 300 to press and support the extraction guide 300 in the one direction V1.

The mold apparatus 10 according to an embodiment of the present disclosure may include the guide moving portion 400 which is disposed in the other direction V2 from the column mold portion 200 and is connected to the one end 317 of the extraction guide 300 to move the extraction guide 300 in the one direction V1.

Specifically, the guide moving portion 400 may include a first moving portion 410 connected to the one end 317 of the extraction guide 300 to move the extraction guide 300 in the one direction V1.

As illustrated in FIG. 1, in the first process, the first moving portion 410 may be in contact with the fixing plate 900 and may be supported in the one direction V1 by the fixing plate 900.

The guide moving portion 400 may include a second moving portion 430 which is provided between the column mold portion 200 and the first moving portion 410 and is penetrated by the extraction guide 300.

The guide moving portion 400 may include a driving portion 450 and a coupling portion 470 which are to be described later. Specifically, the guide moving portion 400 may include the driving portion 450, which is connected to the second moving portion 430 and is provided to move the second moving portion 430 in the one direction V1, and the coupling portion 470, which is provided at the first moving portion 410 and is selectively coupled to the second moving portion 430.

The first moving portion 410 may be provided to be moved in the one direction V1 by the second moving portion 430 as the coupling portion is coupled to the second moving portion.

As illustrated in FIG. 1, before the rotating member 100 is extracted, the second moving portion 430 may be coupled to the first moving portion 410 by the coupling portion 470 and may be connected to the driving portion 450 so that the second moving portion 430 may be supported in the one direction V1 by the first moving portion 410.

The driving portion 450 may include a second driving body 453 connected to the second moving portion 430 and a first driving body 451 connected to the second driving body 453 to move the second driving portion 453 in the one direction V1.

As illustrated in FIG. 1, the first driving body 451 may be provided to be fixed to the column mold portion 200, but the first driving body 451 may be separated from the column mold portion 200 and may be fixed separately.

The first driving body 451 may be provided as a hydraulic cylinder etc., and may have any shape as long as the first driving body 451 may provide power to move the second driving body 453 in the one direction V1. Hereinafter, a description will be given by considering the first driving body 451 as the hydraulic cylinder.

A third driving body 455 may be provided between the first driving body 451 and the second driving body 453 to connect the first driving body 451 and the second driving body 453. The first driving body 451 and the third driving body 455 may form a structure of the hydraulic cylinder together. When the extraction process is performed in FIG. 1, a part of the third driving body 455 may be moved to and inserted into the first driving body 451.

Figure 3A:
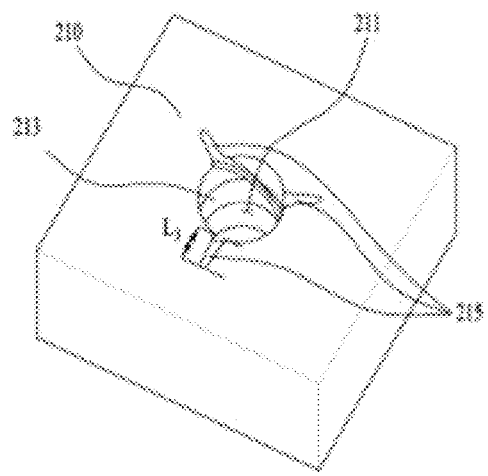
FIGS. 3A and 3B are views illustrating a column molding central core in the mold apparatus according to an embodiment of the present disclosure.
Figure 3B:
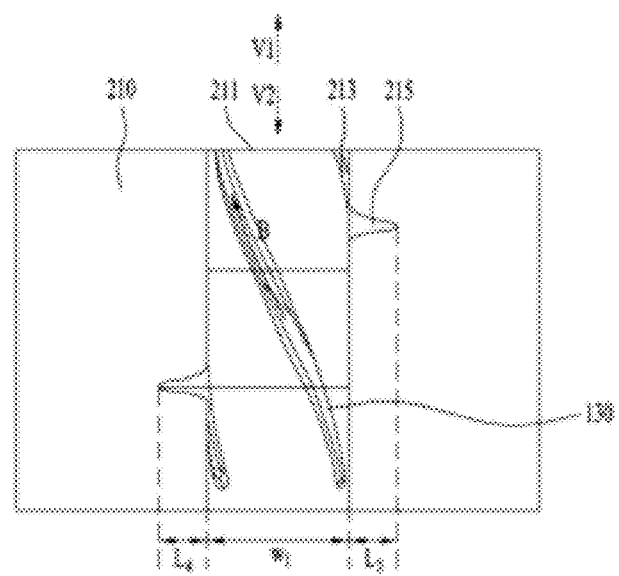

FIGS. 3A and 3B are views illustrating a column molding central core in the mold apparatus according to an embodiment of the present disclosure. FIG. 3A is a perspective view of the column molding central core 210, and FIG. 3B is a cross-sectional view of the column molding central core 210.

As described above with reference to FIG. 1, the column mold unit 200 may include the column molding central core 210 in which at least a part of the rotating member 100 is molded. In addition, as described above with reference to FIG. 2, the rotating member 100 includes the plural blades 130 provided on the outer circumferential surface of the column portion 110 and extending to be inclined in the one direction V1.

As illustrated in FIG. 3A, the column mold portion 200 may include the first column molding hole 211 which extends in the one direction V1 and is provided to mold the column portion 110 therein. Specifically, the first column molding hole 211 may be formed by penetrating the column molding central core 210 in the one direction V1.

The length of the first column molding hole 211 extending in the one direction V1 may be variously selected according to the height of the bottom mold portion 500 and the height of the column portion 110 which are to be described later.

As illustrated in FIG. 3A, the column molding central core 210 may be provided as a rectangular parallelepiped and may be provided by the first column molding hole 211 in a penetrating manner in the one direction V1. However, the column molding central core 210 may have any shape if the column molding central core 210 is properly provided in the column mold portion 200.

The column mold portion 200 may include the first blade molding grooves 215 provided as an intaglio on the inner circumferential surface of the first column molding hole 211 and having a shape corresponding to the blades 130.

Specifically, the first blade molding grooves 215 may be formed to be recessed into the inner circumferential surface of the first column molding hole 211 to correspond to the height of the blades 130 protruding from the column portion 110.

Therefore, as illustrated in FIG. 3B, a depth L3 of any one of the first blade molding grooves 215 recessed into the inner circumferential surface of the first column molding hole 211 may be provided to be different from a depth L4 of another first blade molding groove 211 recessed into the inner circumferential surface of the first column molding hole 211.

The first blade molding grooves 215 may be recessed into the inner circumferential surface of the first column molding hole 211 to correspond to the height of the protruding blades 130 and may be recessed into the inner circumferential surface of the first column molding hole 211 to form a thickness corresponding to the thickness of the blades 130.

The first blade molding grooves 215 may be formed to correspond to the blades 130 in number and may be formed to correspond to the inclined direction B of the blade 130.

Figure 4:
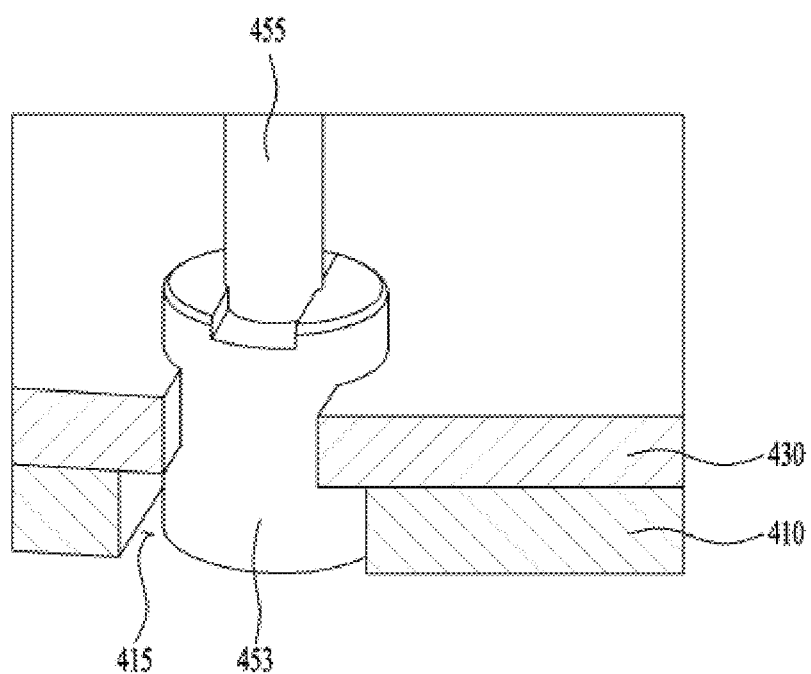
FIG. 4 is a perspective view illustrating a guide moving portion coupled to a driving portion in the mold apparatus according to an embodiment of the present disclosure.

FIG. 4 is a perspective view illustrating the guide moving portion 400 coupled to the driving portion 450 in the mold apparatus 10 according to an embodiment of the present disclosure. Specifically, FIG. 4 is a view illustrating the second moving portion 430 coupled to the driving portion 450 before the rotating member 100 is extracted from the column mold portion 200 in FIG. 1.

The mold apparatus 10 according to an embodiment of the present disclosure may include the guide moving portion 400 disposed in the other direction V2 from the column mold portion 200 and connected to one end 317 of the extraction guide 300 to move the extraction guide 300 in the one direction V1.

Specifically, the guide moving portion 400 may include the first moving portion 410 connected to the one end 317 of the extraction guide 300 to move the extraction guide 300 in the one direction V1.

As illustrated in FIG. 1, before the rotating member 100 is extracted, the first moving portion 410 may be in contact with the fixing plate 900 and may be supported in the one direction V1 by the fixing plate 900.

The guide moving portion 400 may include the second moving portion 430 which is provided between the column mold portion 200 and the first moving portion 410 and is penetrated by the extraction guide 300.

Before the rotating member 100 is extracted, the second moving portion 430 may contact the first moving portion 410 and may be supported in the one direction V1 by the first moving portion 410.

The guide moving portion 400 may include the driving portion 450 connected to the second moving portion 430 and provided to move the second moving portion 430 in the one direction V1. The driving portion 450 may be provided in plural to be connected to the second moving portion 430.

As described above, the driving portion 450 may include the second driving body 453 connected to the second driving body 453 and the first driving body 451 connected to the second driving body 453 to move the second driving portion 453 in the one direction V1.

The third driving body 455 may be provided between the first driving body 451 and the second driving body 453 to connect the first driving body 451 and the second driving body 453. The first driving body 451 and the third driving body 455 may form a structure of the hydraulic cylinder together. When the extraction process is performed in FIG. 1, a part of the third driving body 455 may be moved to and inserted into the first driving body 451.

The second driving body 453 may be coupled to the second moving portion 430 while passing through the second moving portion 430. The second driving body 453 and the second moving portion 430 may be coupled by welding, screw coupling, or interference fitting, and any coupling type may be applied as long as the second driving body 453 and the second moving portion 430 may be coupled to each other.

While the second driving body 453 may also pass through the first moving portion 410 disposed in the other direction V2 from the second moving portion 430 while passing through the second moving portion 430. As the second driving body 453 passes through the first moving portion 410, the second driving body 453 may contact the fixing plate 900 in the other direction V2 and may be supported in the one direction V1 by the fixing plate 900 before the rotating member 100 is extracted.

The second driving body 453 may penetrate the first moving portion 410 and face an inner circumferential surface of a through hole 415 of the first moving portion 410 while being separated from the through hole 415 of the first moving portion 410. In a primary extraction process to be described later, the second moving portion 430 is moved toward the column mold portion 200 at the same speed as the first moving portion 410 but, in a secondary extraction process, only the second moving portion 430 may be moved toward the column mold portion 200.

Accordingly, in the secondary extraction process, the second driving body 453 may be moved in the one direction V1 toward the column mold portion 200 to be longer than the first moving portion 410, and the second driving body 453 may not face the through hole 415 by being completely separated from the through hole 415.

Figure 5:
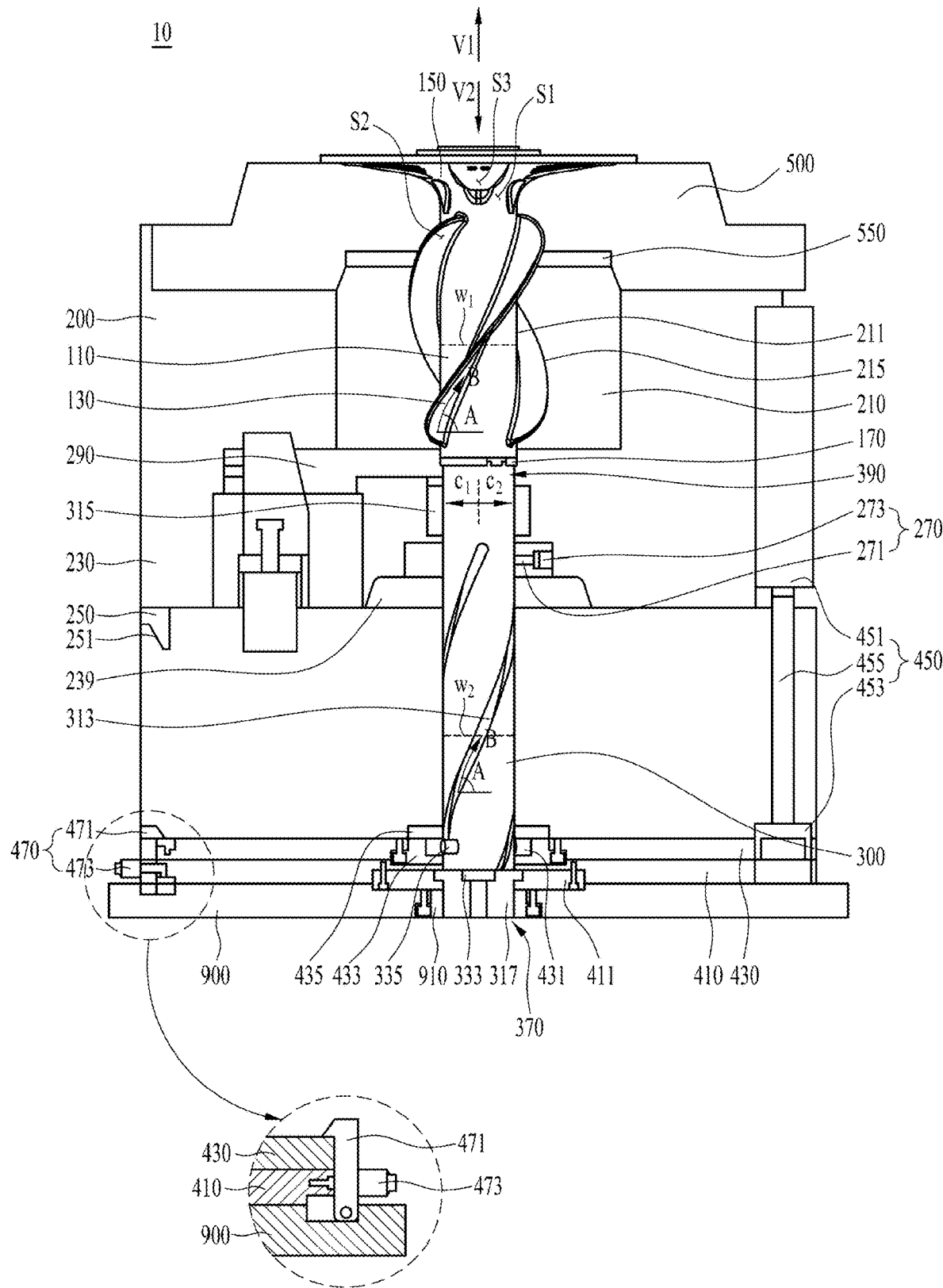
FIG. 5 is a cross-sectional view illustrating a coupling portion in the mold apparatus according to an embodiment of the present disclosure.

FIG. 5 is a cross-sectional view illustrating a coupling portion in the mold apparatus according to an embodiment of the present disclosure. FIG. 5 is an enlarged view illustrating the coupling portion 470 in the mold apparatus 10 according to the embodiment of the present disclosure illustrated in FIG. 1. Hereinafter, a description overlapping with the above-described structure will be omitted.

In the mold apparatus 10 according to an embodiment of the present disclosure, the guide moving portion 400 may include the coupling portion 470 provided on the first moving portion 410 and selectively coupled to the second moving portion 430.

The first moving portion 410 may be provided between the fixing plate 900 and the second moving portion 430 so as to be in contact with the second moving portion 430.

The coupling portion 470 may include a coupling body 471 which is coupled to one surface of the first moving portion 410 facing the fixing plate 900 to extend in the one direction V1 and is coupled to the other surface of the second moving portion 430 facing the column mold portion 200 from the second moving portion 430.

As illustrated in FIG. 5, before the rotating member 100 is extracted, the first moving portion 410 and the second moving portion 430 may be in contact with each other, and the coupling body 471 may be provided to be connected to both the first moving portion 410 and the second moving portion 430.

The length of the coupling body 471 extending in the one direction V1 may be provided to be longer than the sum of the thickness of the first moving portion 410 and the thickness of the second moving portion 430. In the first process step, the coupling body 471 may contact the fixing plate 900 and may be supported by the fixing plate 900 in the one direction V1.

The coupling portion 470 may include a coupling pin 473 provided to be inserted into the first moving portion 410 by penetrating the coupling body 471 perpendicularly to an extending direction of the coupling body 471.

The coupling pin 473 may press the coupling body 471 towards the first moving portion 410 in an insertion direction of the coupling pin 473 so that the coupling body 471 and the second moving portion 430 may be coupled without being separated in the first process.

An elastic portion (not illustrated) may be provided inside the coupling pin 473, and the elastic portion may continuously press the coupling body 471 in the insertion direction of the coupling pin 473 during the rotative extraction process.

Figure 6A:
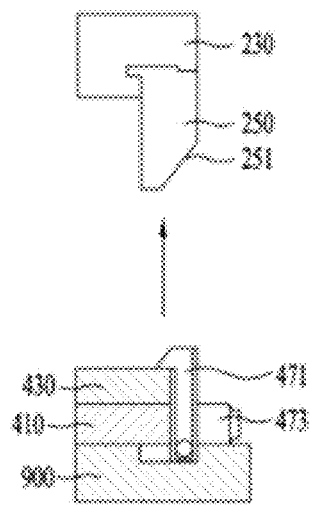
FIGS. 6A and 6B are cross-sectional views illustrating a coupling portion and a fixing portion in the mold apparatus according to an embodiment of the present disclosure.
Figure 6B:
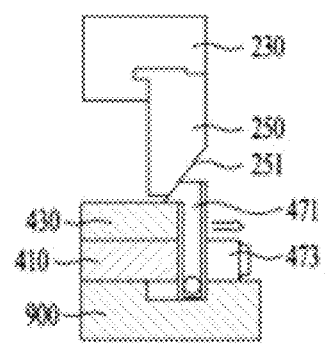

FIGS. 6A and 6B are cross-sectional views illustrating the coupling portion 470 and a fixing portion 250 in the mold apparatus 10 according to an embodiment of the present disclosure.

FIG. 6A is a cross-sectional view illustrating a state before the coupling portion 470 described in FIG. 5 contacts the fixing portion 250. FIG. 6B is a cross-sectional view illustrating a state in which the coupling portion 470 described in FIG. 5 is moved in the one direction V1 and is in contact with the fixing portion 250. Hereinafter, a description overlapping with the above-described structure will be omitted.

As illustrated in FIG. 6A, in the mold apparatus 10 according to an embodiment of the present disclosure, the column mold portion 200 may further include the fixing portion 250 provided to face the coupling portion 470 and coupled to the coupling portion 470 when the coupling portion 470 contacts the fixing portion 250 as the first moving portion 410 is moved in the one direction V1.

Specifically, the fixing portion 250 may be provided so as to be in contact with the coupling portion 470 at the column mold body 230 of the column mold portion 200 to face the coupling portion 470 in correspondence with the position of the coupling portion 470.

As illustrated in FIG. 6B, in a process of primarily extracting the rotating member 100 (hereinafter, a second process), the second driving body 453 may be moved in the one direction V1 by the first driving body 451, the second moving portion 430 coupled to the second driving body 453 may be moved in the one direction V1, and the first moving portion 410 coupled to the second moving portion 430 by the coupling portion 470 may be moved in the one direction V1 together with the second moving portion 430.

The coupling portion 470 may be moved together with the second moving portion 430 in the one direction V1, and movement of the first moving portion 410 in the one direction V1 in the second process to be described later may be performed until a timing at which the coupling body 471 comes into contact with the fixing portion 250 and is coupled to the fixing portion 250.

Later, the coupling body 471 may contact a gear 1931 of the fixing portion 250 so that a portion of the coupling body 471 coupled to the second moving portion 430 is moved in a width direction of the second moving portion 430 and the coupling body 471 may be separated from the second moving portion 430.

Accordingly, if a direction in which a part of the coupling body 471 is separated from the second moving portion 430 is as illustrated in FIG. 6B, one surface of the coupling body 471 contacting the gear 1931 of the fixing portion 250 may be provided to form an acute angle with respect to the second moving portion 430. The gear 1931 of the fixing portion 250 may be provided to form an obtuse angle with respect to the second moving portion 430.

Figure 7A:
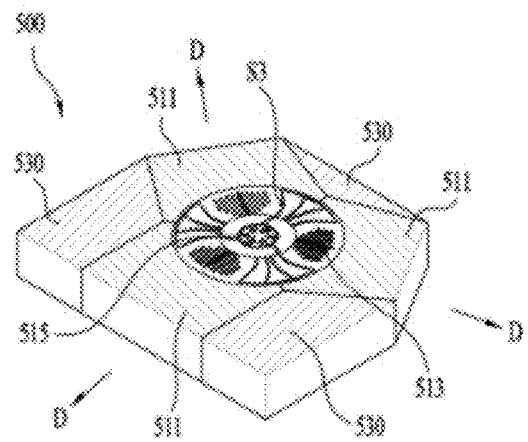
FIGS. 7A and 7B are views illustrating a bottom mold portion in the mold apparatus according to an embodiment of the present disclosure.
Figure 7B:
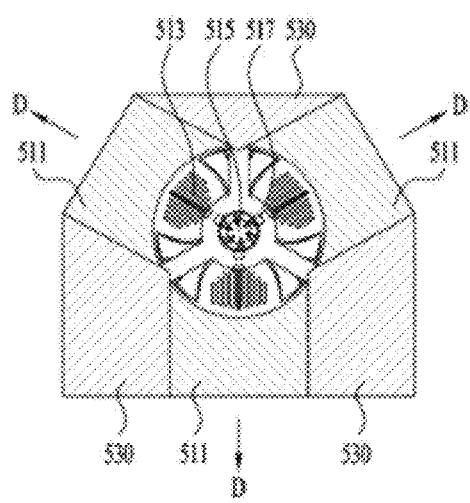

FIGS. 7A and 7B are views illustrating a bottom mold portion in the mold apparatus according to an embodiment of the present disclosure. FIG. 7A is a perspective view illustrating the bottom mold part, and FIG. 7B is a top view of the bottom mold portion viewed from the other direction V2. Hereinafter, a description overlapping with the above-described structure will be omitted.

Referring to FIG. 2, the rotating member 100 may include the bottom portion 150 connected to the other end 319 of the column portion 110 and having a larger diameter than the diameter of the column portion 110.

As illustrated in FIG. 1, the mold apparatus 10 according to an embodiment of the present disclosure may include the bottom mold portion 500 which is positioned in the one direction V1 of the column mold portion 200 and includes a bottom molding space S3 which communicates with the first column molding hole 211 and is provided to mold the bottom portion 150.

The bottom mold portion 500 may be provided between the shielding mold portion 600, to be described later, positioned in the one direction V1 of the column mold portion 200 and the column mold portion 200.

Injection liquid may flow from the shielding mold portion 600 into the bottom mold portion 500, and the injection liquid may flow into the column mold portion 200 through the bottom mold portion 500.

As illustrated in FIG. 7A, the bottom mold portion 500 may include bottom molding bodies 513 provided in a shape corresponding to one surface of the bottom portion 150 in the one direction V1 and bottom mold moving bodies 511 connected to an outer circumferential surface of the bottom molding bodies 513 along the circumference of the bottom molding bodies 513.

The bottom molding bodies 513 may be provided to be recessed in the other direction V2 to correspond to the shape of the bottom portion 150 illustrated in FIG. 2. When injection liquid flowing into the bottom mold portion 500 is introduced into the bottom molding space D3 in which the bottom molding bodies 513 are molded, a shape corresponding to one surface of the bottom portion 150 may be molded.

The diameter of the bottom molding body 513 may correspond to the diameter of the bottom portion 150 and the bottom molding body 513 may be made of a material having high heat durability because of direct contact with a high temperature injection liquid.

Meanwhile, the protrusion provided on the bottom portion 150 may protrude in the other direction V2 so as to be inclined in the inclined direction B of the blade 130. Therefore, when the second process in which the rotating member 100 is primarily extracted is performed, the rotating member 100 may not be extracted by the protrusion provided on the bottom portion 150, and the protrusion may be damaged.

Therefore, when the second process is performed, the bottom molding bodies 513 may be divided and moved in a radial direction D of the bottom mold portion 500, that is, in a radial direction D of the bottom portion 150. In other words, the bottom mold portion 500 may be composed of a plurality of split bodies divided in an outer circumferential direction of the bottom portion 150, and the split bodies may be provided to be movable in the radial direction D of the bottom portion 150.

For example, the split bodies may correspond to split bodies of the bottom molding bodies 513 and the number of the bottom molding bodies 513 and thus correspond to the bottom mold moving bodies 511 connected to the outer circumferential surface of the bottom mold bodies 513.

As the bottom molding bodies 513 are provided, parting lines corresponding to the number of the split bodies may be formed on one surface from the protrusion of the bottom portion 150 in the other direction V2.

As illustrated in FIG. 1, the bottom mold portion 500 may include a bottom mold bush 550 provided between the column mold portion 200 and the bottom mold moving bodies 511 to contact the column mold portion 200 and the bottom mold moving bodies 511.

When the bottom mold moving bodies 511 are moved in the radial direction D of the bottom portion 150 so that the rotating member 100 may be extracted, the bottom mold bush 550 may support the bottom mold moving bodies 511 in a central direction of the column mold portion 200 so that the bottom mold moving bodies 511 may not be excessively separated from the center of the column mold portion 200.

Therefore, the bottom mold bush 550 may set a maximum movable range of the bottom mold moving bodies 511 such that the bottom mold moving bodies 511 may not be excessively moved from the center of the column mold portion 200.

The bottom mold portion 500 may include bottom mold fixing bodies 530 provided between the bottom mold moving bodies 511 and connected to the column mold portion 200 and the bottom mold moving bodies 511 so as to be fixed to the column mold portion 200.

The bottom mold fixing bodies 530 may correspond in number to the bottom mold moving bodies 511 and may uniformly guide a moving direction of the bottom mold moving bodies 511.

As illustrated in FIG. 7B, the bottom mold portion 500 may include a second column molding hole 515 provided to be penetrated in the one direction V1 from the center of the bottom molding bodies 513.

The second column molding hole 515 may be positioned in the one direction V1 of the first column molding hole 211 and may communicate the first column molding hole 211 with the bottom molding space S3.

Specifically, as illustrated in FIG. 1, the bottom mold portion 500 may be provided with the second column molding hole 515 to mold at least a part of the column portion 110. A second blade molding groove 517 in which at least a part of the blades 130 is molded may be provided on an inner circumferential surface of the second column molding hole 515.

The second blade molding groove 517 may be provided to be connected to the first blade molding groove 215 to correspond to the shape of the blades 130. Like the first blade molding groove 215, the second blade molding groove 517 may be provided on the inner circumferential surface of the second column molding hole 515 to correspond to the inclined direction B of the blades 130.

The second blade molding groove 517 may be provided on the inner circumferential surface of the second column molding hole 515 to correspond to a protruding length and thickness of the blades 130.

The second blade molding groove 517 may be provided in plural to correspond in number to the blades 130 so that the second blade molding grooves 517 may be separately disposed in the inner circumferential direction of the second column molding hole 515. As illustrated in FIG. 7B, the second blade molding grooves 517 may be provided on the inner circumferential surface of the second column molding hole 515 by being separated from each other by 120 degrees.

Figure 8:
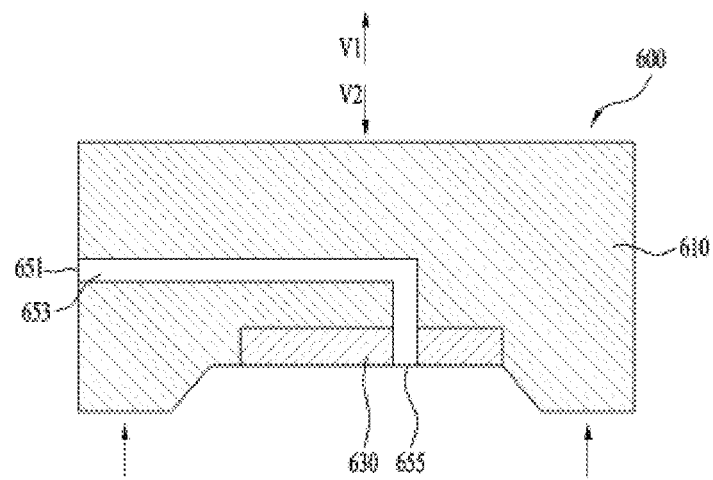
FIG. 8 is a cross-sectional view illustrating a shielding mold portion separated from a bottom mold portion in the mold apparatus according to an embodiment of the present disclosure.
Figure 8:
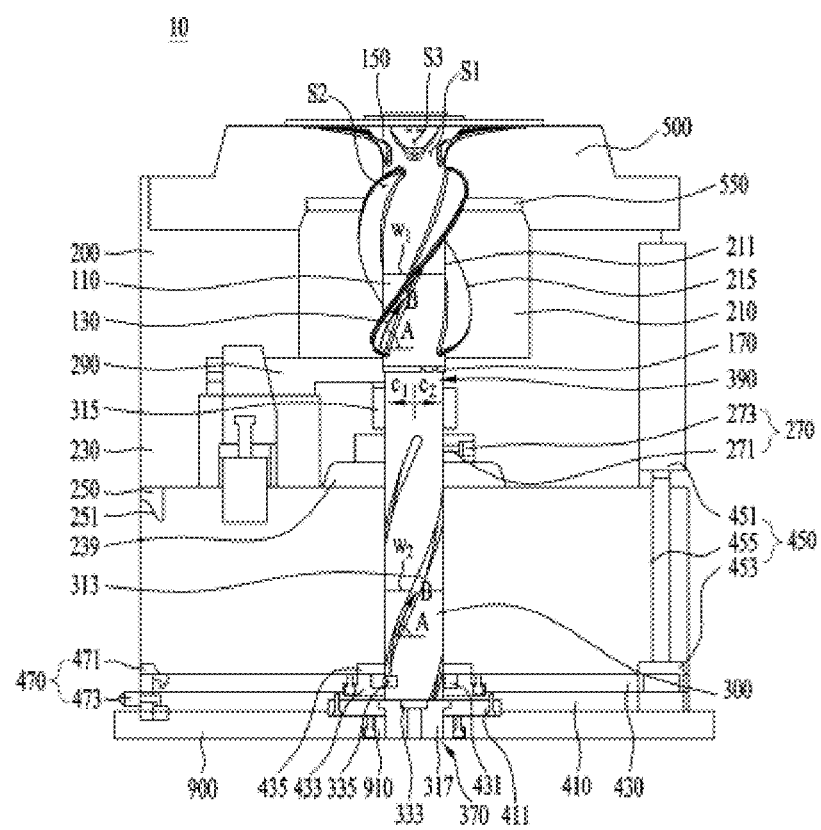

FIG. 8 is a cross-sectional view illustrating a shielding mold portion 600 separated from the bottom mold portion 500 in the mold apparatus 10 according to an embodiment of the present disclosure.

FIG. 8 illustrates a state in which the shielding mold portion 600 is separated from the bottom mold portion 500 after the cooling or hardening of the rotating member 100 is completed, that is, after the first process is completed. Hereinafter, a description overlapping with the above-described structure will be omitted.

In the mold apparatus 10 according to an embodiment of the present disclosure, the bottom molding space S3 may be open in the one direction V1, and the mold apparatus 10 may include the shielding mold portion 600 which is positioned in the one direction V1 of the bottom mold portion 500 to shield the bottom molding space S3 and has an injector for injecting injection liquid into the bottom molding space S3.

In the first process, the shielding mold portion 600 may contact the bottom mold portion 500 to form the bottom molding space S3 and guide injection liquid to the bottom mold portion 500 and the column mold portion 200.

The shielding mold portion 600 may include a shielding mold body 610 forming the exterior of the shielding mold portion 600 and a bottom shielding mold 630 provided between the shielding mold body 610 and the bottom mold portion 500 to shield the bottom molding space S3 of the bottom mold portion 500.

The bottom shielding mold 630 may be provided to correspond to a shape of the other surface of the bottom portion 150, which will be described later, positioned in the one direction V1. In the first process, the injector 650 to be described later may penetrate the bottom shielding mold 630 so that injection liquid is guided to the bottom molding space S3.

The shielding mold portion 600 may include the injector 650 through which injection liquid flows into the mold apparatus 10. The injector 650 may include an inflow hole 651 through which injection liquid flows into the shielding mold portion 600 from the exterior by penetrating an outer surface of the shielding mold body 610, a guide hole 655 through which injection liquid is guided to the bottom molding space S3 by penetrating the bottom shielding mold 630, and a movement passage 653 for communicating the inflow hole 651 with the guide hole 655 by penetrating the shielding mold body 610.

In the first process, injection liquid may be introduced into the inflow hole 651 and into the bottom molding space S3, the column molding space S1, and the blade molding space S2 through the movement passage 653 and the guide hole 655.

Figure 9:
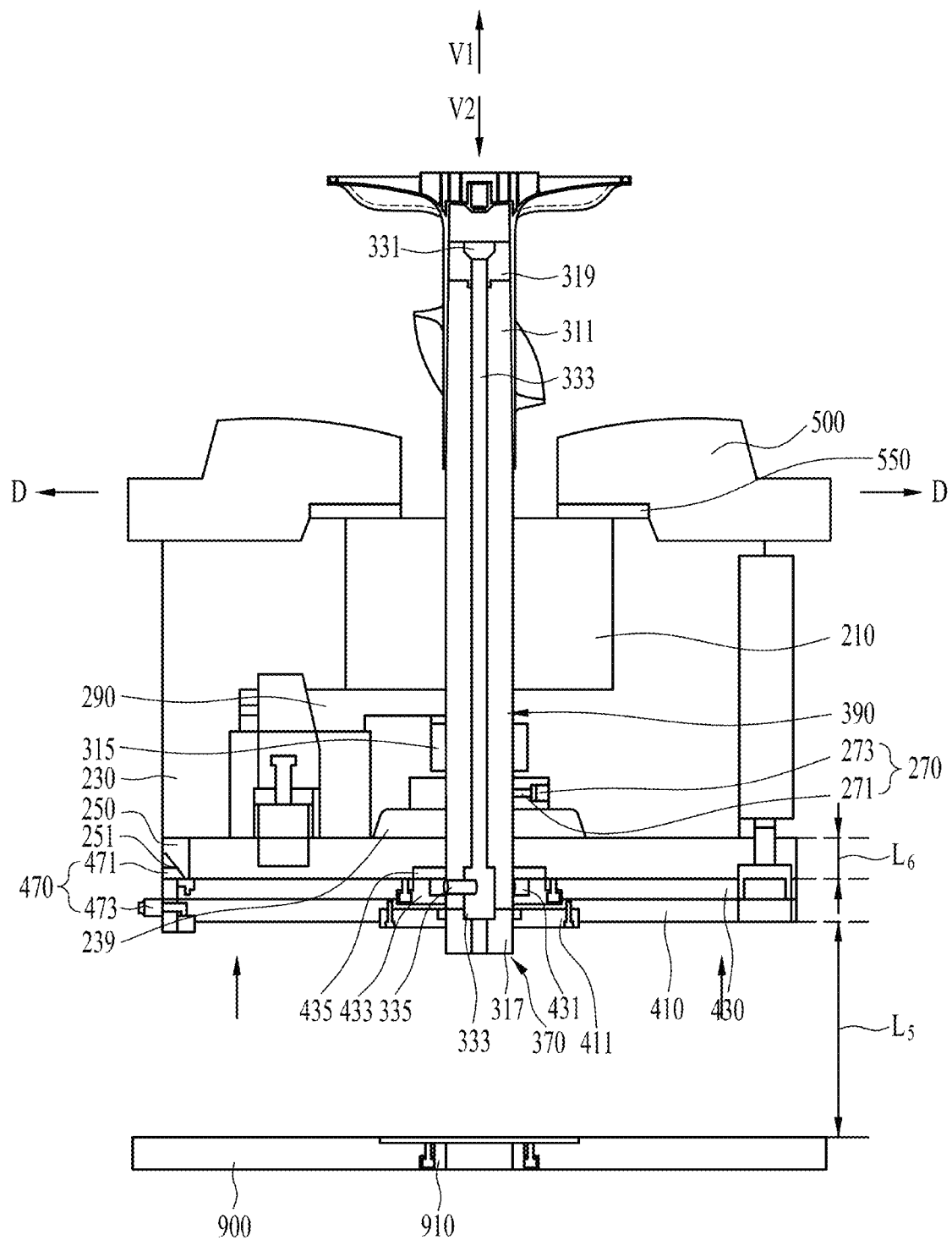
FIG. 9 is a cross-sectional view illustrating a state in which a rotating member is primarily extracted from a column mold portion in the mold apparatus according to an embodiment of the present disclosure.

FIG. 9 is a cross-sectional view illustrating a state in which a rotating member is primarily extracted from a column mold portion in the mold apparatus according to an embodiment of the present disclosure.

FIG. 9 is a view illustrating a state in which a process of primarily extracting the rotating member 100 (hereinafter, a second process) is finished after the first process. Hereinafter, a description overlapping with the above-described structure will be omitted.

When molding of the rotating member 100 is completed after the first process, the shielding mold portion 600 may be moved in the one direction V1 to be separated from the bottom mold portion 500.

When the shielding mold portion 600 is separated from the bottom mold portion 500, the divided bottom mold moving bodies 511 may be moved in a radial direction of the bottom portion 150 and, when the bottom mold moving bodies 511 is moved, the first driving body 451 may move the second driving body 453 in the one direction V1 until the coupling body 471 is coupled to the fixing portion 250.

The second moving portion 430 coupled to the second driving body 453 may be equally moved by a distance by which the second driving body 453 is separated in the one direction V1, and the first moving portion 410 connected to the second driving body 453 by the coupling portion 470 may be moved by a predetermined distance L5 in the one direction V1 while in contact with the second driving body 453.

As the first moving portion 410 is moved by the predetermined distance L5, the extraction guide 300 having one end 317 supported by the first moving portion 410 in the one direction V1 may also be moved by the predetermined distance L5. Then, the extraction guide 300 may rotatively push the column portion 110 contacting the other end 319 of the extraction guide 300 in the one direction V1.

A distance L6 by which the second moving portion 430 is separated from the column mold body 230 may be provided to be smaller than a length of the fixing portion 250 extending from the column mold body 230 to the coupling portion 470. After the second process is completed, at least a part of the fixing portion 250 may be inserted into the second moving portion 430.

Figure 10:
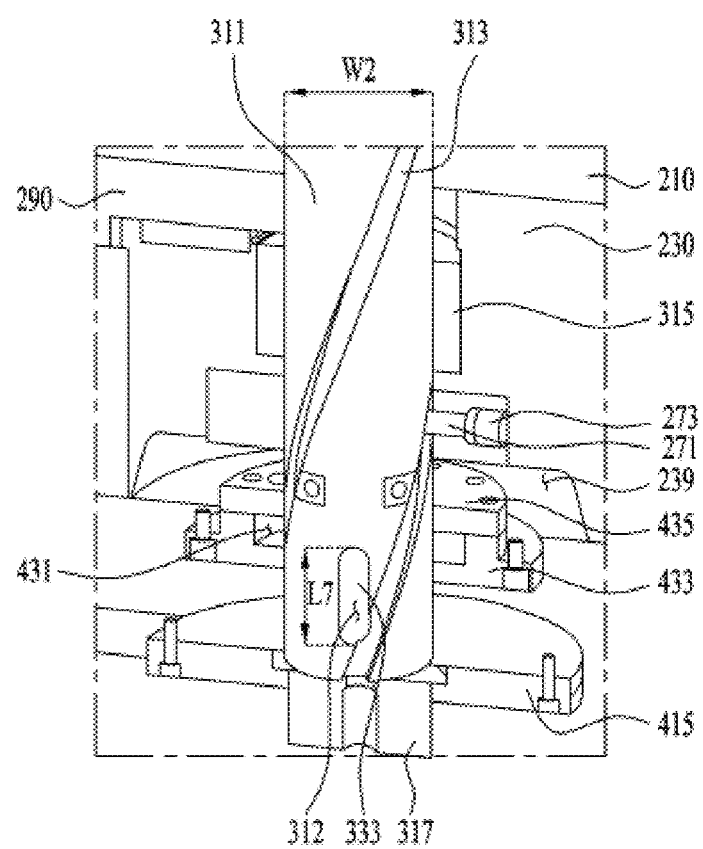
FIG. 10 is a perspective view illustrating an extraction guide in the mold apparatus according to an embodiment of the present disclosure.

FIG. 10 is a perspective view illustrating an extraction guide in the mold apparatus according to an embodiment of the present disclosure. Hereinafter, a description overlapping with the above-described structure will be omitted.

FIG. 10 illustrates a state in which the extraction guide 300 and the guide moving portion 400 of the mold apparatus 10 according to an embodiment of the present disclosure are moved in a process in which the extraction guide 300 secondarily extracts the rotating member 100 (hereinafter, a third process) after the second process.

The extraction guide 300 may include a rotation guide groove 313 which is provided on the outer circumferential surface of the extraction guide 300 and extends while being inclined with respect to the one direction V1 to correspond to the inclined direction B of the blade 130. In addition, the extraction guide 300 may include a primary extraction body 311 having the rotation guide groove 313 provided on the outer circumferential surface of the extraction guide 300 and forming the exterior of the extraction guide 300.

That is, the outer circumferential surface of the extraction guide 300 may correspond to the outer circumferential surface of the primary extraction body 311. An outer diameter W2 of the primary extraction body 311 may correspond to an outer diameter W2 of the extraction guide 300.

The column mold portion 200 may include a rotation guide portion 270 which protrudes toward the rotation guide groove 313 and is inserted into the rotation guide groove 313. The rotation guide portion 270 may include a rotation guide fixing portion 273 provided inside the column mold body 230 and connected to the column mold body 230. A coupling shape of the rotation guide fixing portion 273 and the column mold body 230 may be varied as long as the coupling shape of the rotation guide fixing portion 273 and the column mold body 230 may be coupled to each other.

The rotation guide portion 270 may include a rotation guide body 271 which protrudes from the rotation guide fixing portion 273 toward the rotation guide groove 313 and is inserted into the rotation guide groove 313. The rotation guide body 271 may be fixed by the rotation guide fixing portion 273 when the primary extraction body 311 is rotatively moved in the one direction V1.

One end of the rotation guide body 271 facing the rotation guide groove 313 may be provided to correspond to the shape of the rotation guide groove 313. Accordingly, the one end may always be provided in contact with the rotation guide groove 313 without being separated from the rotation guide groove 313.

The rotation guide groove 313 has an inclined direction B corresponding to the inclined direction B of the blade 130 with respect to the circumferential direction of the column portion 110 and may be provided on the primary extraction body 311.

In the second process, the rotation guide groove 313 and the rotation guide 270 may convert linear motion of the guide moving portion in the one direction into rotational motion of the primary extraction body 311.

Accordingly, the mold apparatus 10 according to an embodiment of the present disclosure may rotatively extract the rotating member 100 from the mold apparatus 10 without having a rotary motor providing separate rotational power. Therefore, it is easy to design the mold apparatus 10 and manufacturing cost of the mold apparatus 10 may be reduced.

The first moving portion 410 may be supported by a primary extraction supporter 411 for accommodating the one end 317 of the extraction guide 300. One end of the primary extraction body 311 in the one end 317 of the extraction guide 300 may be supported in the one direction V1 by the primary extraction supporter 411 of the first moving portion 410.

Accordingly, when the first moving portion 410 is moved, the extraction guide 300 may be moved and, when the primary extraction body 311 is rotated, the extraction guide 300 may be moved in the one direction V1.

After the second process, the coupling portion 470 may be coupled by the fixing portion 250 and the first driving body 451 may further move the second driving body 453 in the one direction V1. As the second driving body 453 is moved in the one direction V1, the second moving portion 430 decoupled from the first moving portion 410 is moved toward the column mold portion 200.

Figure 11:
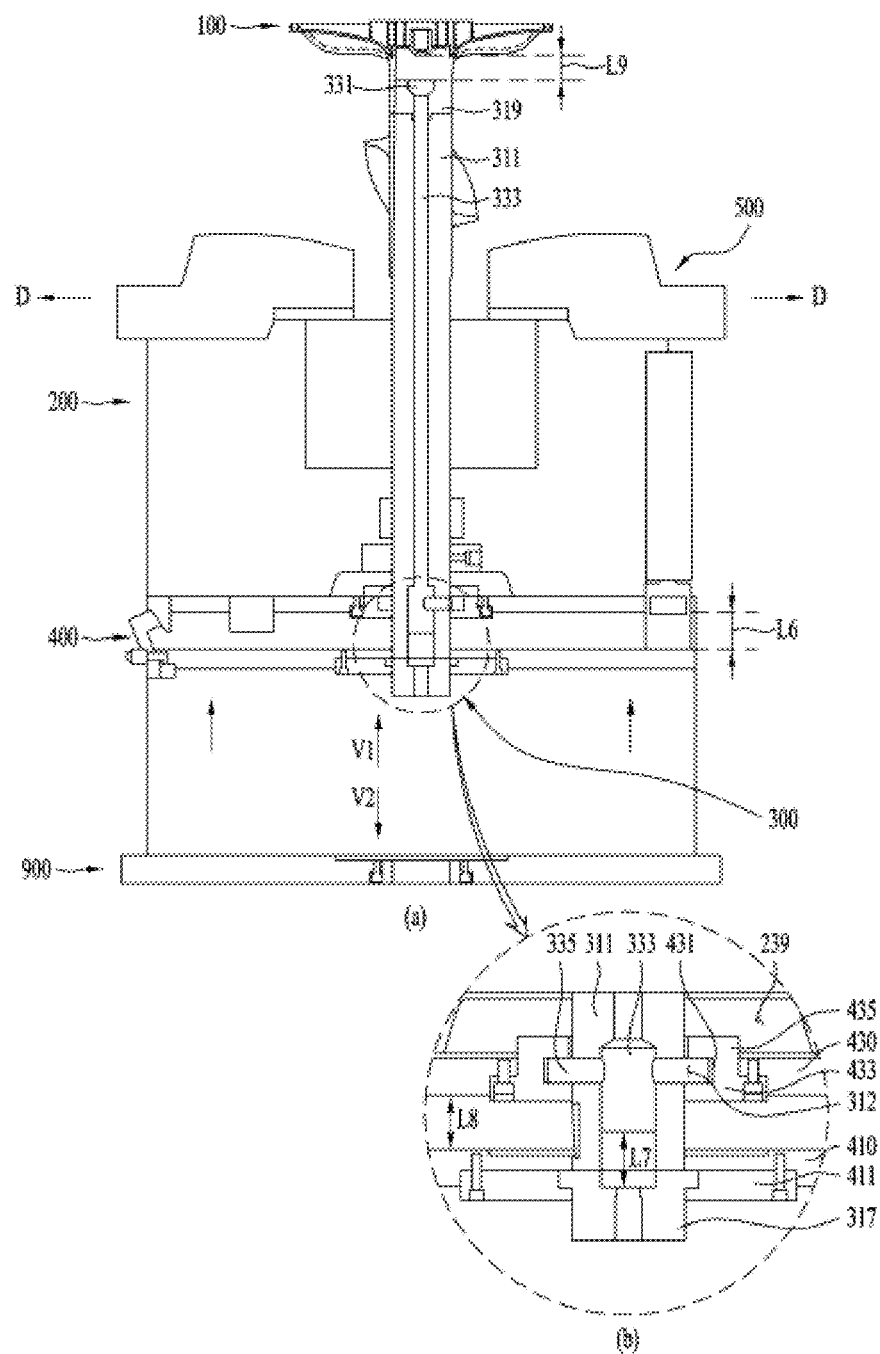
FIG. 11 is a cross-sectional view illustrating a state in which a rotating member is secondarily extracted from an extraction guide in the mold apparatus according to an embodiment of the present disclosure.

FIG. 11 is a cross-sectional view illustrating a state in which a rotating member is secondarily extracted from an extraction guide in the mold apparatus according to an embodiment of the present disclosure.

FIG. 11(*a*) is cross sectional view illustrating a process of secondarily extracting the rotating member 100 from the extraction guide 300 (hereinafter, a third process) after the second process is finished in the mold apparatus 10 according to an embodiment of the present disclosure.

FIG. 11(*b*) is an enlarged view of a portion indicated by dotted lines in FIG. 11(*a*). Specifically, FIG. 11(*b*) is an enlarged view of the one end 317 of the extraction guide 300 in the mold apparatus 10 according to an embodiment of the present disclosure.

Hereinafter, a description overlapping with the above-described structure will be omitted.

The extraction guide 300 may include a secondary extractor 330 provided to be movable in the one direction from the other end 319 of the extraction guide 300, and at least a part of the secondary extractor 330 is provided at the other end 319 of the extraction guide 300.

The secondary extractor 330 may include a pressure moving portion 331 positioned at the other end 319 of the extraction guide 300. In the first process and the second process, the pressure moving portion 331 may be inserted into the primary extraction body 311 to form one surface which is continuous with the other end 319 from the first extraction body 311 toward the one direction and may contact the column portion 110.

The secondary extractor 330 may include an extension portion 333 which is provided inside the primary extraction body 311 and extends from the pressure moving portion 331 toward the guide moving portion 400. The extension portion 333 may penetrating the primary extraction body 311 in the other direction V2 and may extend toward the guide moving portion 400 from the pressure moving portion 331.

The extension portion 333 and the pressure moving portion 331 may be separated from the primary extraction body 311 to perform relative motion based on the one direction V1.

The secondary extractor 330 may include a connector 335 protruding from the extension portion 333 toward an inner circumferential surface of the primary extraction body 311 and penetrating an outer circumferential surface of the primary extraction body 311.

The connector 335 may be coupled to the second moving portion 430 so that the secondary extractor 330 connected to the second moving portion 430 may be moved in the one direction V1 according to movement of the second moving portion 430.

The extraction guide 300 may include a sliding hole 312 which is penetrated by the connector 335 and extends in the one direction, and the connector 335 may be inserted into the sliding hole 312.

The connector 335 may be moved from one end to the other end of the sliding hole 312 based on the one direction V1 when the second moving portion 430 is moved in the one direction V1. A length L7 extending from one end to the other end of the sliding hole 312 may correspond to the distance L7 by which the connector 335 may be moved in the one direction V1. As illustrated in FIG. 10 and FIG. 11(*b*), the extension length L7 may correspond to distance L8 by which the second moving portion 430 is separated from the first moving portion 410. In some cases, the extension length L7 of the sliding hole 312 may be preferably 40 mm.

As illustrated in FIG. 11(*b*), the second moving portion 430 may include an accommodator 431 extending in an outer circumferential direction of the extraction guide 300 so that the connector 335 is accommodated to be rotatable in the outer circumferential direction.

The total extension length of the connector 335 may be provided to be longer than an outer diameter of the primary extraction body 311, and the connector 335 may penetrate the primary extraction body 311 to be accommodated in the accommodator 431. The diameter of an inner circumferential surface of the accommodator 431 may be the same as the extension length of the connector 335.

The second moving portion 430 may include a secondary extraction supporter 433 which is coupled to one surface of the second moving portion 430 positioned in the other direction V2 to press the connector 335 in the one direction V1 and forms the accommodator 431. The secondary ejection support 433 may be penetrated by the primary ejection body 311.

The second moving portion 430 may be provided with an accommodator cover 435 which is coupled to the other surface of the second moving portion 430 positioned in the one direction V1 to be coupled to the secondary extraction supporter 433 and forms the secondary extraction supporter 433 and the accommodator 431 together.

The accommodator cover 435 may not form a continuous surface with the other surface of the second moving portion 430. That is, the sum total of the thicknesses of the accommodator cover 435 and the secondary ejection supporter 433 may be formed to be longer than the thickness of the second moving portion 430.

The connector 335 may be supported in the other direction V2 by the accommodator cover 435. The connector 335 may be moved from one end to the other end of the sliding hole 312 in the third process and may rotate within the accommodator 431.

As the connector 335 is moved in the one direction V1 while performing rotation, the extension portion 333 may be separated from the one end 317 of the extraction guide 300 by the predetermined distance L7. The distance L7 may correspond to the extension length of the sliding hole 312.

Figure 12A:
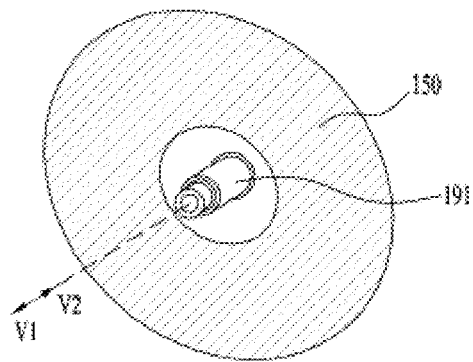
FIGS. 12A and 12B are views illustrating a shaft coupling member of a rotating member in the mold apparatus according to an embodiment of the present disclosure.
Figure 12B:
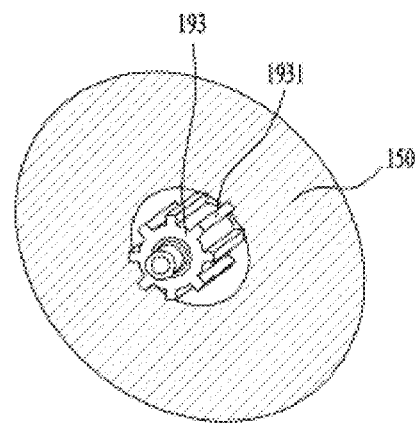

FIGS. 12A and 12B are views illustrating a shaft coupling member of a rotating member in the mold apparatus according to an embodiment of the present disclosure. Hereinafter, a description overlapping with the above-described structure will be omitted.

In the mold apparatus 10 according to an embodiment of the present disclosure, the rotating member 100 may be provided with a shaft coupling member 193 through which a rotating shaft (not illustrated) is coupled to the bottom portion 150. Specifically, the rotating shaft may refer to a member that provides rotational power to the rotating member 100 after the rotating member 100 ends extraction from the mold apparatus 10.

For example, when the rotating member 100 is provided in a washing machine for washing clothes, the rotating shaft etc. may be coupled to the rotating member 100 so that rotational power is provided to the column portion 110 to rotate in a circumferential direction C of the column unit 110. In this case, the rotating member 100 may be used as a member for stirring washing water and clothes in the washing machine.

The rotating member 100 may include a shaft coupling protrusion protruding in the one direction V1 from the other surface of the bottom portion 150 positioned in the one direction V1. The center of the shaft coupling protrusion coincides with the center of the column portion 110 and the center of the bottom portion 150 so that the shaft coupling protrusion may not rotate eccentrically when the rotating member 100 rotates, and vibration and noise may be minimized.

The shaft coupling protrusion may be molded in the bottom molding space S3. Accordingly, the shaft coupling protrusion may be provided in a shape corresponding to at least a part of the bottom shielding mold 630 provided on one surface toward the bottom mold 500 in the shielding mold portion 600 illustrated in FIG. 8.

The shaft coupling member 193 may be coupled to a part of the outer circumferential surface of the shaft coupling protrusion and may be provided on the other surface of the bottom portion 150 by being inserted into the shaft coupling protrusion.

The shaft coupling member 193 may include a plurality of gears 1931 protruding in a radial direction of the shaft coupling protrusion along the circumference of the outer circumferential surface of the shaft coupling member 193. The gears 1931 may be coupled to the rotating shaft and may be provided on the shaft coupling member 193 to provide power to the rotating member 100. The shielding mold portion 600 illustrated in FIG. 8 may be provided to shield the bottom molding space S3 after the shaft coupling member 193 is inserted into the bottom molding space S3.

Figure 13A:
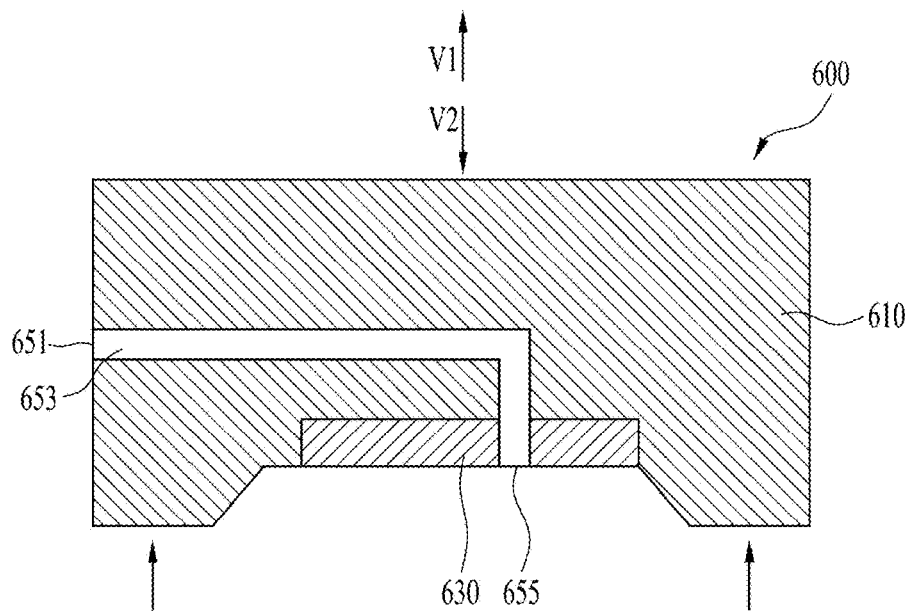
FIGS. 13A to 13C are views illustrating a process in which a rotating member is extracted from the mold apparatus according to an embodiment of the present disclosure.
Figure 13A:
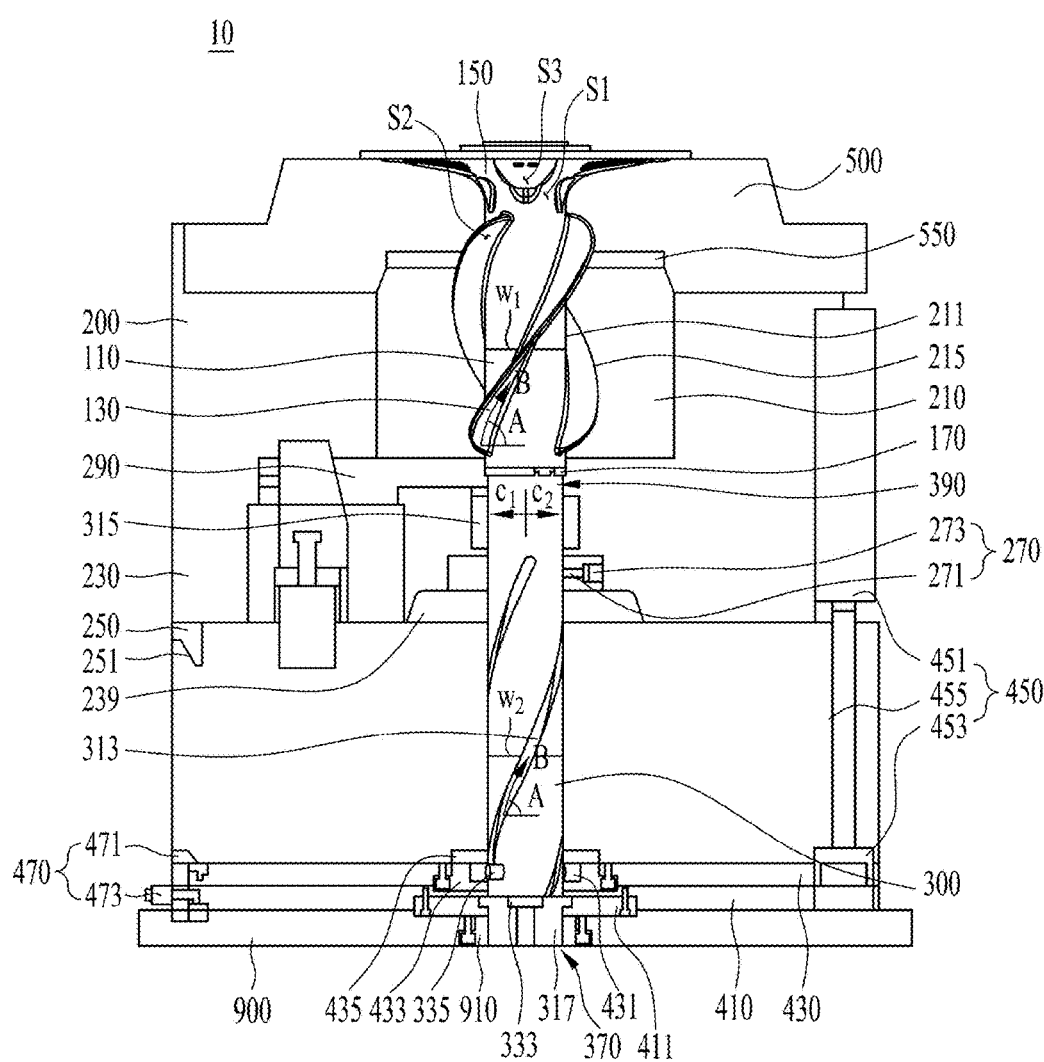
Figure 13B:
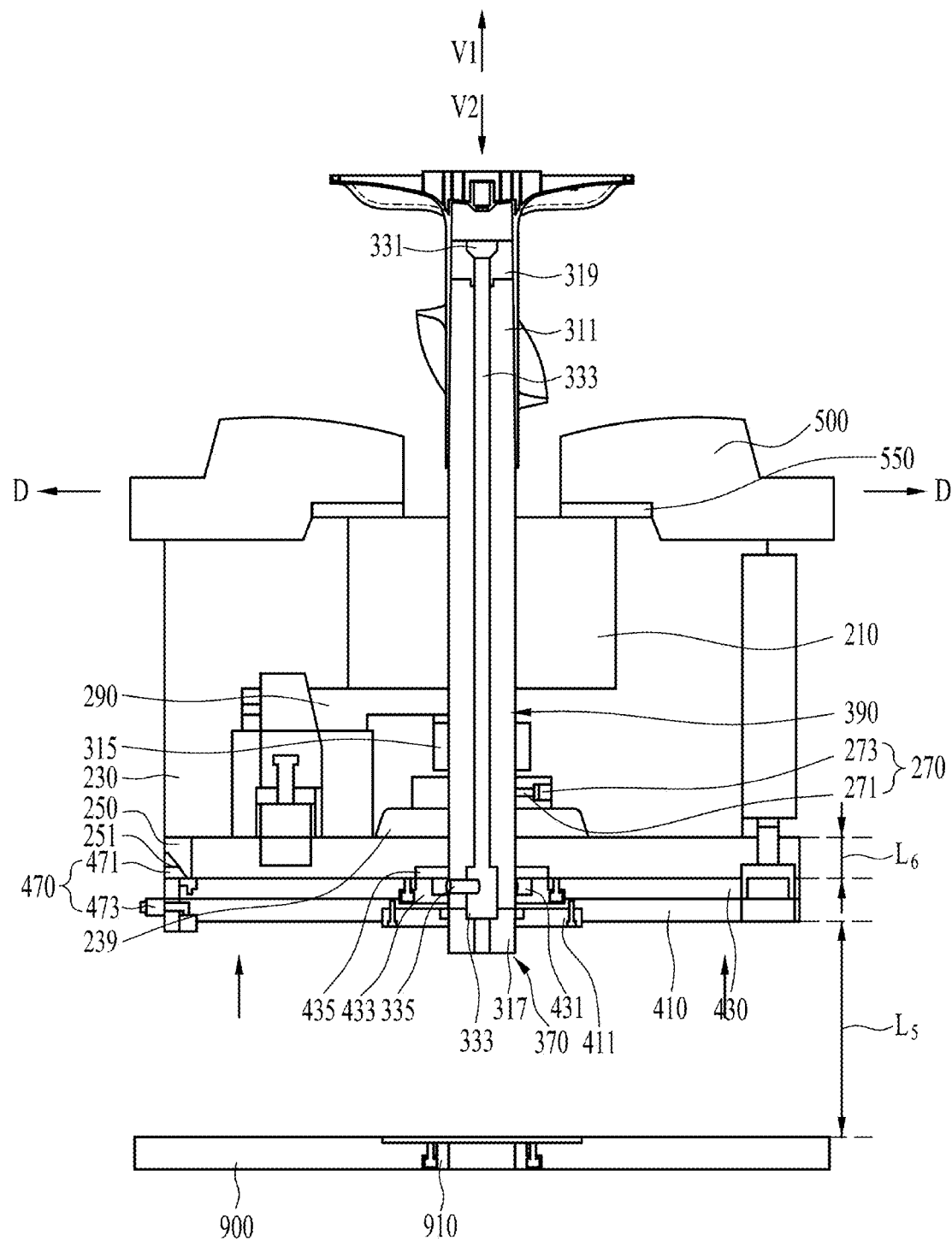
Figure 13C:
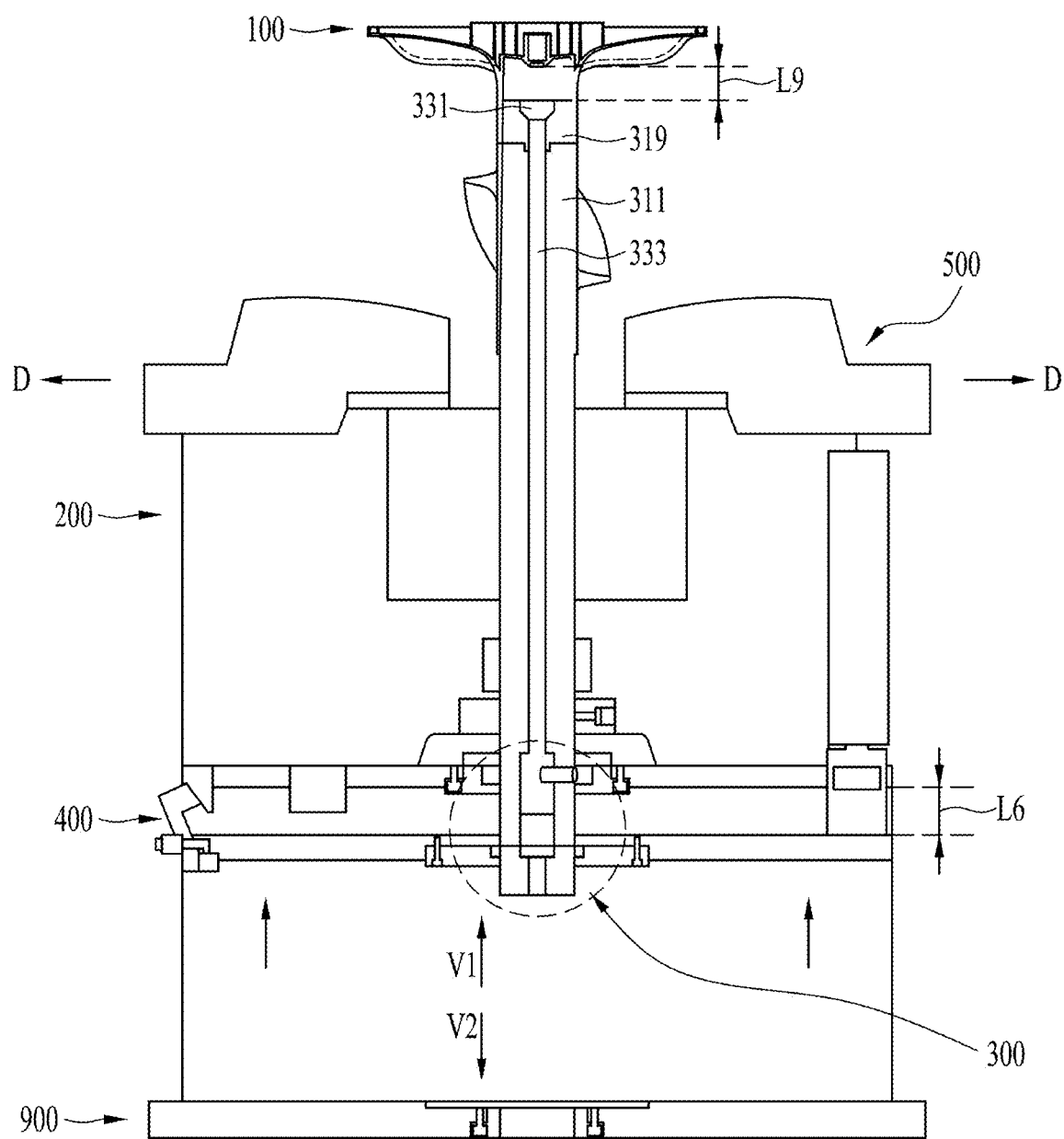

FIGS. 13A to 13C are views illustrating an overall process in which a rotating member is extracted from the mold apparatus according to an embodiment of the present disclosure.

FIG. 13A is a cross-sectional view illustrating a first process as illustrated in FIGS. 1 and 8, FIG. 13B is a cross-sectional view illustrating a second process as illustrated in FIG. 9, and FIG. 13C is a view illustrating a third process as illustrated in FIG. 11.

Hereinafter, a description overlapping with the above-described structure will be omitted.

As illustrated in FIG. 13A, the first process may be started while the shielding mold portion 600 is moved in the other direction V2 to contact the bottom mold portion 500.

Injection liquid may be introduced into the column molding space S1, the blade molding space S2, and the bottom molding space S3 through the injector 650.

The other end 319 of the ejection guide 300 may form a part of the column molding space S1 together with the column molding central core 210 and the column coupling mold portion 290, and the other portion 319 of the ejection guide 300 may contact the injection liquid.

When the injection liquid flows into the column molding space S1, the blade molding space S2, and the bottom molding space S3, and molding of the rotating member 100 is completed, the first process may be terminated.

As illustrated in FIG. 13B, a primary extraction step, i.e., the second process, may be started while the bottom mold moving bodies 511 of the bottom mold portion 500 are moved in a radial direction of the bottom portion 150.

The bottom mold moving bodies 511 may be moved in the radial direction D of the bottom portion 150 so as to be distant from each other, and the second driving body 453 may be moved by the first driving body 451 in the one direction V1.

The second driving body 453 may be moved in the one direction V1 until the coupling portion 470 is coupled to the fixing portion 250 and the coupling with the second moving portion 430 is released.

The first moving portion 410 is coupled to the second moving portion 430 by the coupling portion 470 and is moved in the one direction V1, and the extraction guide 300 having one end supported by the first moving portion 410 may be moved in the one direction V1.

In this case, a distance by which the extraction guide 300 is moved may correspond to a distance by which the first moving portion is moved. When the extraction guide 300 is moved in the one direction V1, the rotation guide groove 313 may contact the rotation guide portion 270 and may be moved in the one direction V1 while rotating in the inclined direction B of the blade 130.

The connector 335 of the extraction guide 300 may be inserted into the sliding hole 312 and may be positioned at one end of the sliding hole 312. The connector 335 of the extraction guide 300 may rotate at a corresponding rotation speed according to the rotation of the extraction guide 300 and may be accommodated in the accommodator 431, so that the connector 335 may perform turning movement based on the center of the extraction guide 300 in the accommodator 431.

The extension portion 333 of the secondary extractor 330 may be supported by the one end 317 of the extraction guide 300 and may be moved in the one direction V1 at the same speed as the primary extraction body 311.

On the other hand, since the other end 319 of the extraction guide 300 pushes the column portion 110 in the one direction V1 along the inclined direction B of the blade 130, the rotating member 100 may be extracted from the column mold portion 200 without damage to the blade 130.

The second process may be terminated when the coupling portion 470 is coupled to the fixing portion 250 so that the coupling portion 470 is decoupled from the second moving portion 430 and when the position of the first moving portion 410 is fixed.

As illustrated in FIG. 13C, the secondary extraction step, i.e., the third process, may be started while the second moving portion 430 coupled to the second driving body 453 is moved in the one direction V1.

When the second moving portion 430 is moved in the one direction V1, the accommodator 431 may be moved in the one direction V1, and the connector 335 supported by the accommodator 431 in the one direction V1 may be moved in the one direction V1 according to an extension direction of the sliding hole 312.

In this case, unlike the second process, in the third process, the connector 335 may move linearly in the one direction V1 without performing turning movement.

The connector 335 may be moved up to the other end of the sliding hole 312. The extension length of the sliding hole 312 may correspond to a distance by which the second moving portion 430 is moved in the third process or may correspond to a distance by which the extension portion 333 of the secondary extractor 330 is moved.

While the extension portion 333 moves in the one direction V1, the pressure moving portion 331 may be exposed to the other end 319 of the extraction guide 300 to push the column portion 110 in the one direction V1.

The third process may be ended when the pressure moving portion 331 pushes the column portion 110 in the one direction V1 from the other end 319 of the extraction guide 300.

Accordingly, the column portion 110 may be moved in the one direction V1 to correspond to a movement distance of the pressure moving portion 331, and contact force between the inner circumferential surface of the column portion 110 and the outer circumferential surface of the primary extraction body 311 may be reduced.

Through the third process, the manufacturer of the rotating member 100 may conveniently extract the rotating member 100 from the other end 319 of the extraction guide 300 to the outside of the mold apparatus 10.

In the mold apparatus 10 according to an embodiment of the present disclosure, after the rotating member 100 extracted after the third process is separated from the extraction guide 300, a fourth process of cooling a molded product at room temperature may be performed.

When the third process is finished and the second moving portion 430 is moved in the other direction V2 to contact the first moving portion 410, the coupling portion 470 coupled to the fixing portion 250 may be decoupled, and the second moving portion 430 and the first moving portion 410 may be coupled again.

The first moving portion 410 may be coupled to the second moving portion 430 to be moved in the other direction V2, and the first moving portion 410 and the second moving portion 430 may be moved in the other direction V2 until the first moving portion 410 contacts the fixing plate 900.

While the first moving portion 410 and the second moving portion 430 are moved, the extraction guide 300 may also be moved in the other direction V2, and the rotating member 100 and the extraction guide 300 may be separated from each other.

The rotating member 100 may be subjected to an out-of-mold cooling process in which the molded product is cooled at an external room temperature of the column mold portion 200. In the first process, the rotating member 100 has been cooled or hardened, but temperature inside the column mold portion 200 and the bottom mold portion 500 may be higher than room temperature, so that residual thermal stress may still be generated in a material of the rotating member 100.

In addition, since residual thermal stress may be generated in the material of the rotating member 100 even after the first to third processes are performed, the rotating member 100 may be subject to out-of-mold cooling by being exposed to room temperature.

Embodiments of the present disclosure may provide a mold apparatus including a guide moving portion that rotatively extracts a rotating member molded by injection molding.

Embodiments of the present disclosure may provide a mold apparatus that minimizes generation of parting lines on the surface of a rotating member during injection molding.

Embodiments of the present disclosure may provide a mold apparatus that minimizes defects such as flashes or surface steps formed on the exterior of a rotating member.

Embodiments of the present disclosure may provide a mold apparatus having a simple design structure by omitting a separate rotational power device for rotation during rotative extraction.

The effects of the present disclosure are not limited to what has been particularly described hereinabove and other advantages not described herein will be more clearly understood by persons skilled in the art from the above detailed description of the present disclosure.

While various embodiments of the present disclosure have been described in detail, it will be understood by those of ordinary skill in the art that various changes in form and details may be made therein without departing from the spirit and scope of the present disclosure as defined by the claims. Accordingly, the scope of the present disclosure should not be limited to the described embodiments, but should be defined by the accompanying claims and equivalents thereof.

What is claimed is:

1. A mold apparatus for molding a rotating member including a column portion extending in a first direction and a blade that is disposed at an outer circumferential surface of the column portion, that extends from a first end of the column portion to a second end of the column portion, and that is inclined with respect to the first direction, the mold apparatus comprising:
- a column mold portion including (i) a first column molding hole that extends in the first direction and that is configured to mold the column portion therein, (ii) a first blade molding groove that is formed as an intaglio on an inner circumferential surface of the first column molding hole to have a shape corresponding to the blade and that is configured to mold the blade therein, and (iii) a rotation guide portion that protrudes from an inner circumferential surface of the column mold portion; and
- an extraction guide including a rotation guide groove that extends in an inclined direction of the blade, at least a portion of the extraction guide being positioned inside the first column molding hole,
- wherein the extraction guide is configured to be rotated in an inclined direction of the rotation guide groove by the rotation guide portion while moving in the first direction, and
- wherein the extraction guide is configured to press the column portion to thereby extract the column portion from the first column molding hole while the column portion rotates in the inclined direction of the blade.

2. The mold apparatus of claim 1, wherein the extraction guide has a first end that is positioned outside the column mold portion and a second end that is positioned inside the first column molding hole, and
- wherein the mold apparatus further comprises a guide moving portion that is connected to the first end of the extraction guide and that is configured to move the extraction guide in the first direction.

3. The mold apparatus of claim 1, wherein the extraction guide (i) has a first end positioned outside the column mold portion and a second end positioned inside the first column molding hole and (ii) is inserted into the column portion so that the column portion has a cavity shape.

4. The mold apparatus of claim 3, wherein the extraction guide further includes a secondary extractor that has a part provided at the second end of the extraction guide and that is movable in the first direction from the second end of the extraction guide, and
- wherein the part of the secondary extractor is configured to move in the first direction from the second end of the extraction guide in a state in which the column portion is extracted from the first column molding hole.

5. The mold apparatus of claim 4, further comprising:
- a guide moving portion that is connected to the first end of the extraction guide and that is configured to move the extraction guide in the first direction,
- wherein the secondary extractor includes:
  - a pressure moving portion positioned at the second end of the extraction guide, and
  - an extension portion extending from the pressure moving portion toward the guide moving portion inside the extraction guide,
- wherein the guide moving portion is connected to the extension portion and is configured to move the extension portion in the first direction with respect to the extraction guide, and
- wherein the extension portion is configured to move in the first direction to thereby move the pressure moving portion in the first direction.

6. The mold apparatus of claim 5, wherein the guide moving portion includes:
- a first moving portion that is connected to the first end of the extraction guide and that is configured to move the extraction guide in the first direction, and
- a second moving portion that is connected to the extension portion and that is configured to move the extension portion in the first direction with respect to the extraction guide.

7. The mold apparatus of claim 6, wherein the guide moving portion further includes:
- a driving portion that is connected to the second moving portion and that is configured to move the second moving portion in the first direction, and
- a coupling portion that is provided at the first moving portion and that is coupled to the second moving portion, and
- wherein the first moving portion is configured to move in the first direction by the second moving portion based on the coupling portion being coupled to the second moving portion.

8. The mold apparatus of claim 7, wherein the column mold portion further includes a fixing portion that faces the coupling portion and that is coupled to the coupling portion, and
- wherein the coupling portion is configured to decouple from the second moving portion and is coupled to the fixing portion to couple, based on the coupling portion contacting the fixing portion as the first moving portion is moved in the first direction, the first moving portion to the column mold portion.

9. The mold apparatus of claim 6, wherein the secondary extractor further includes a connector that extends from the extension portion, that passes through an outer circumferential surface of the extraction guide, and that is connected to the second moving portion at an outside of the extraction guide, and
- wherein the extraction guide further includes a sliding hole extending in the first direction and through which the connector passes.

10. The mold apparatus of claim 9, wherein the extraction guide is configured to move in the first direction while rotating in the inclined direction of the blade, and
- wherein the second moving portion includes an accommodator in which the connector is accommodated to be rotatable.

11. The mold apparatus of claim 1, wherein the rotating member further includes a bottom portion that is connected to the second end of the column portion and that has a diameter greater than a diameter of the column portion, and
- wherein the mold apparatus further comprises a bottom mold portion that is positioned in the first direction with respect to the column mold portion and that includes a bottom molding space (i) communicating with the first column molding hole and (ii) configured to mold the bottom portion.

12. The mold apparatus of claim 11, wherein the bottom mold portion includes a plurality of split bodies divided in an outer circumferential direction of the bottom portion, and
- wherein the split bodies are configured to move in a radial direction of the bottom portion.

13. The mold apparatus of claim 12, wherein the bottom molding space defines an opening in the first direction, and
- wherein the mold apparatus further comprises a shielding mold portion that is positioned in the first direction with respect to the bottom mold portion, that shields the bottom molding space, and that includes an injector configured to inject injection liquid into the bottom molding space.

14. The mold apparatus of claim 13, wherein the rotating member includes a shaft coupling member disposed at the bottom portion, and wherein the shielding mold portion is configured to, based on the shaft coupling member being inserted into the bottom molding space, shield the bottom molding space.

15. The mold apparatus of claim 11, wherein the bottom mold portion includes a second column molding hole that is positioned in the first direction of the first column molding hole and that is in communication with the first column molding hole and the bottom molding space, wherein a second blade molding groove is disposed at an inner circumferential surface of the second column molding hole and is configured to mold the blade with the first blade molding groove by communicating with the first blade molding groove, and wherein the second blade molding groove, based on being connected to the first blade molding groove, defines a shape of the blade together with the first blade molding groove.

16. The mold apparatus of claim 1, wherein the first blade molding groove comprises a plurality of the first blade molding grooves that are separately disposed along an inner circumferential direction of the first column molding hole.

17. The mold apparatus of claim 1, wherein the rotating member further includes a column coupling portion extending from the second end of the column portion in a second direction facing the first direction and having a diameter less than a diameter of the column portion, and wherein the mold apparatus further comprises a column coupling mold portion that is positioned in the second direction with respect to the column mold portion and that includes a column coupling molding space that is (i) in communication with the first column molding hole and (ii) configured to mold the column coupling portion.

18. The mold apparatus of claim 17, wherein the column coupling mold portion includes a plurality of split bodies divided in an outer circumferential direction of the column coupling portion, and wherein the split bodies are configured to move in a radial direction of the column coupling portion.

19. The mold apparatus of claim 1, wherein an end of the extraction guide is configured to be inserted into the column portion to thereby define a cavity shape in the column portion.

* * * * *